United States Patent
Shirochi et al.

(10) Patent No.: US 6,556,266 B1
(45) Date of Patent: Apr. 29, 2003

(54) LIQUID CRYSTAL PROJECTOR HAVING PHASE DIFFERENCE MEANS WITH INCLINED ANGLE

(75) Inventors: Yoshiki Shirochi, Chiba (JP); Keiichi Nito, Tokyo (JP); Yoshio Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 183 days.

(21) Appl. No.: 09/624,663

(22) Filed: Jul. 25, 2000

(30) Foreign Application Priority Data

Jul. 27, 1999 (JP) ............................................ 11-212179

(51) Int. Cl.$^7$ ............................................ G02F 1/1335
(52) U.S. Cl. ...................... 349/118; 349/119; 349/120; 349/121
(58) Field of Search ................................. 349/118, 119, 349/120, 121, 117

(56) References Cited

U.S. PATENT DOCUMENTS 5,157,523 A * 10/1992 Yamagishi et al. ............ 359/41
5,375,006 A * 12/1994 Haas ............................ 359/73
5,490,006 A *  2/1996 Masumoto et al. ............ 359/73
5,570,215 A * 10/1996 Omae et al. .................. 359/73
6,157,471 A * 12/2000 Bignolles et al. ............. 359/15

* cited by examiner

*Primary Examiner*—Robert H. Kim
*Assistant Examiner*—Andrew Schechter
(74) *Attorney, Agent, or Firm*—Frommer Lawrence & Haug LLP; William S. Frommer; Leonard J. Santisi

(57) ABSTRACT

A liquid crystal projector providing an image having a high luminance and excellent contrast, including a polarization plate which is arranged at an incident side of a liquid crystal panel and transmits a first polarized beam therethrough, a polarization plate which is arranged at an exit side of the liquid crystal panel and transmits an optically modulated second polarized beam therethrough and outputs the same to a projection lens, and a phase difference film having one of a phase delay axis or a phase forward axis which is orthogonal to the polarization axis of the polarization plate and arranged inclined at a predetermined angle about an axis of rotation comprising an axis parallel to the polarization axis of the polarization plate in the plane in which said phase delay axis or phase forward axis is formed.

19 Claims, 27 Drawing Sheets

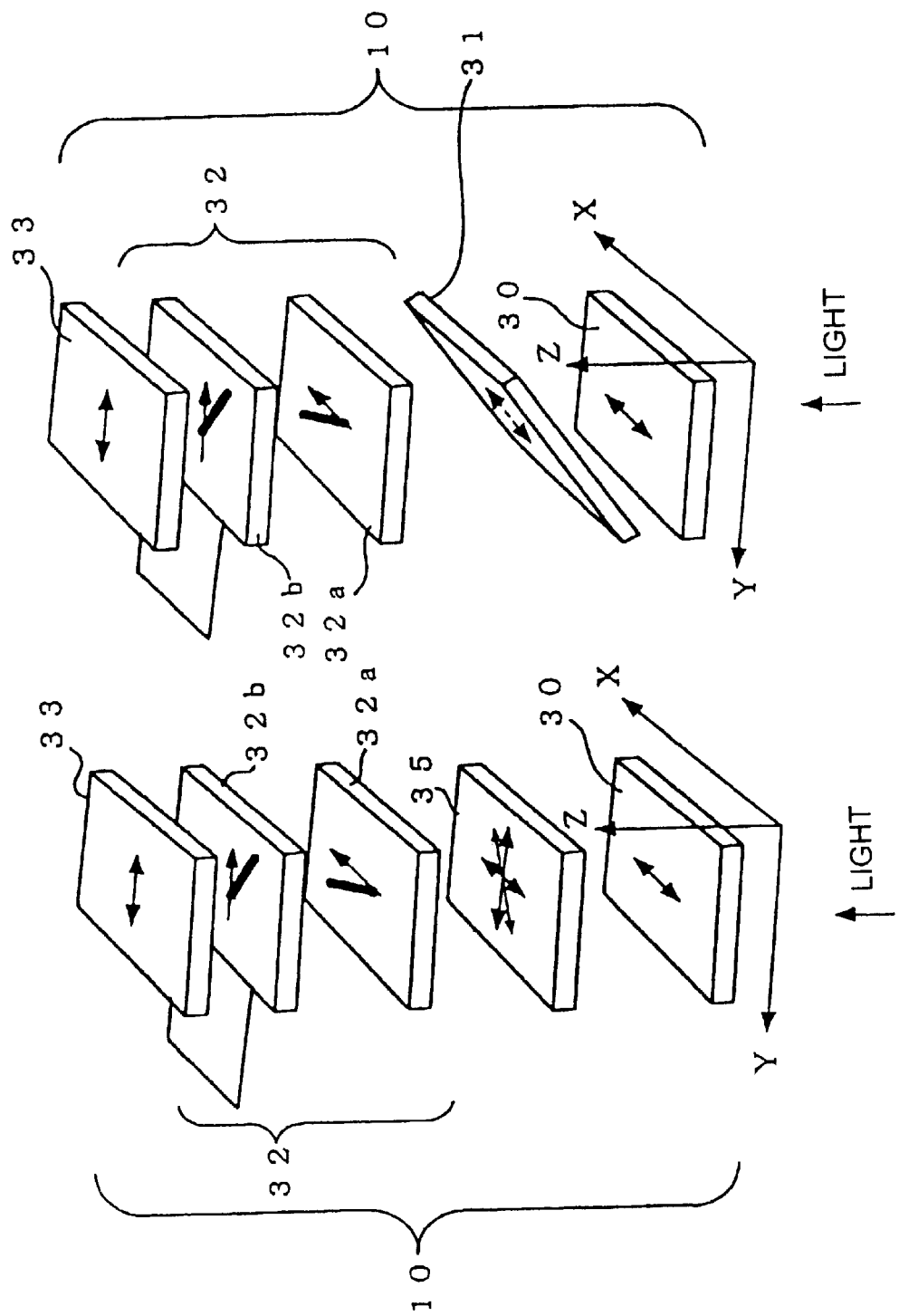

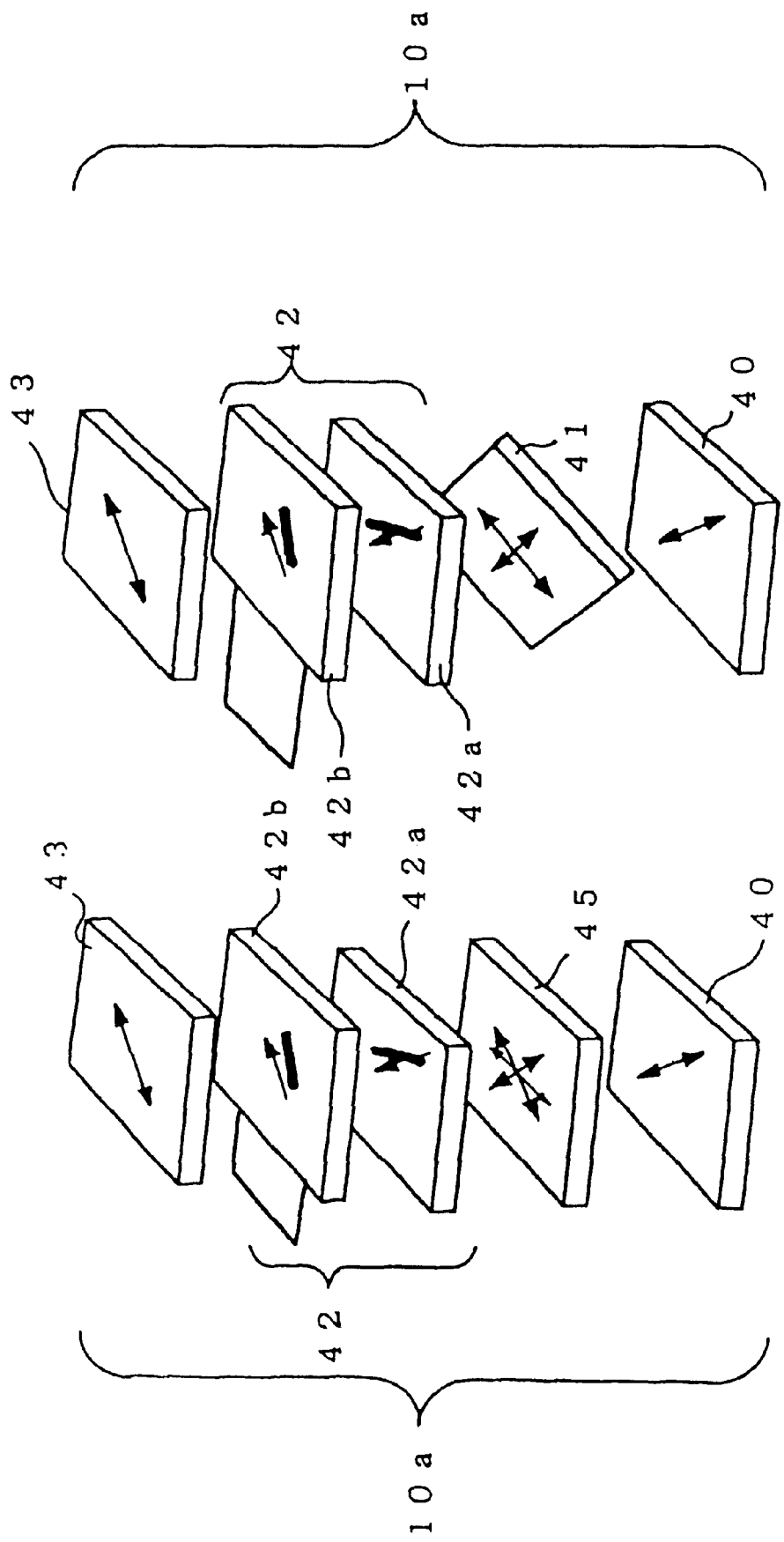

| α (deg) | -40 | -30 | -25 | -20 | -15 | -10 | -5 | 0 | 5 |
|---|---|---|---|---|---|---|---|---|---|
| IMPROVEMENT | 1.59 | 1.86 | 2.02 | 2.08 | 1.92 | 1.57 | 1.19 | 0.88 | 0.65 |
| CONTRAST | 3832 | 4481 | 4885 | 5016 | 4627 | 3797 | 2877 | 2113 | 1559 |

| α (deg) | -30 | -25 | -20 | -15 | -10 | -5 | 0 | 5 |
|---|---|---|---|---|---|---|---|---|
| IMPROVEMENT | 6.25 | 5.51 | 4.19 | 2.92 | 2.00 | 1.39 | 1.00 | 0.74 |
| CONTRAST | 2760 | 2433 | 1849 | 1290 | 883 | 615 | 442 | 329 |
| BLACK LEVEL INTENSITY | 0.0124 | 0.0141 | 0.0185 | 0.0265 | 0.0388 | 0.0557 | 0.0775 | 0.1040 |

FIG. 26

| α (deg) | -60 | -50 | -40 | -30 | -20 | -10 | 0 |
|---|---|---|---|---|---|---|---|
| IMPROVEMENT | 2.27 | 2.54 | 2.58 | 2.35 | 1.84 | 1.29 | 0.87 |
| CONTRAST | 5504 | 6157 | 6252 | 5688 | 4466 | 3125 | 2115 |

LIQUID CRYSTAL PROJECTOR HAVING PHASE DIFFERENCE MEANS WITH INCLINED ANGLE

BACKGROUND OF THE INVENTION

1. Field of the Invention

The present invention relates to a liquid crystal projector designed to broaden a viewing angle of a liquid crystal panel and thereby improve the display evenness and contrast.

2. Description of the Related Art

There is known a liquid crystal projector which optically modulates light output from a light source by for example a transmission type liquid crystal panel to form an optical image and projects this optical image on a screen or the like.

For example, a three-panel type liquid crystal projector which modulates light by liquid crystal panels corresponding to the R, G, and B color light and combines the optical images of these colors formed by this optical modulation to form a color image can output a good quality color image.

Summarizing the disadvantages to be solved by the invention, in such a liquid crystal projector, where trying to improve the contrast, since the image is viewed projected on a screen arranged in a predetermined direction, it has been considered unnecessary to improve the viewing angle of the liquid crystal panels. Accordingly, in each liquid crystal panel, the contrast has been improved by reducing the transmittance of the light at the time of blocking light at the center position of incidence.

Note that for example notebook type personal computers etc. assume viewing of the same image by a number of users from positions of certain angles, so are designed considering viewing angle dependency.

Further, when constructing a liquid crystal projector, it is required that the distribution of the display luminance at the screen be constant when signals of an identical level are input to the entire panel. This uniformity of luminance on the screen is referred to as a high display uniformity and is regarded as one of the important factors for achieving high grade images.

One of the causes of display unevenness is considered to be, for example, unevenness in the luminance of a light emitting part of a light source. Such an unevenness of luminance is projected as it is on the screen, so a high display uniformity cannot be obtained.

Therefore, to correct this unevenness of luminance, the practice has been to arrange a required optical element between the light source and the liquid crystal panel so as to uniformly illuminate the incident surface of the liquid crystal panel. Accordingly, the viewing angle dependency of the liquid crystal panel per se had not been considered.

Further, for example, when using marginal light emitted at a relatively large angle with respect to the optical axis in order to make the light output from the light source contribute more to the image, the light blocking performance in the liquid crystal panel deteriorates and so-called the black display portions are displayed somewhat brightly, i.e., a so-called black color whitening phenomenon occurs. Due to this, in an image having a high luminance, there is remarkable black level whitening even if the contrast is the same and an image without good blackness will be formed.

Further, when trying to utilize the marginal rays, the deterioration of the contrast becomes greater in particular at the blue liquid crystal panel having a strong light intensity. When adjusting the white balance in such a state, it suffers from the disadvantage that the contrast of three R, G, and B colors is determined based on the blue liquid crystal panel having the worst contrast among the three liquid crystal panels.

For this reason, a liquid crystal projector effectively utilizing the light from a light source to improve the luminance for a wide viewing angle and thereby enabling formation of an image excellent in contrast in that state has been demanded.

SUMMARY OF THE INVENTION

An object of the present invention is therefore to provide a liquid crystal projector giving an image having a high luminance and excellent contrast.

According to a first aspect of the invention, there is provided a liquid crystal projector provided with a light source, an illumination optical system for converging the light emitted from the light source to a required optical path, a liquid crystal panel for optically modulating the light converged by the illumination optical system, and a projection lens for magnifying and projecting the light modulated by the liquid crystal panel, the liquid crystal projector further provided with a first polarization plate which is arranged at an incident side of the liquid crystal panel and transmits a first polarized light converged by the illumination optical system therethrough, a second polarization plate which is arranged at an exit side of the liquid crystal panel, transmits a second polarized light modulated by the liquid crystal panel therethrough, and outputs the same to the projection lens, and a phase difference means having one of a phase delay axis or a phase forward axis which is orthogonal to a polarization axis of the first or second polarization plate and arranged inclined by a predetermined angle about an axis of rotation comprised of an axis parallel to the polarization axis of the first or second polarization plate in the plane in which the phase correcting means is formed.

According to a second aspect of the invention, there is provided a liquid crystal projector provided with a light source, an illumination optical system for converging the light emitted from the light source to a required optical path, a liquid crystal panel for optically modulating the light converged by the illumination optical system, and a projection lens for magnifying and projecting the light modulated by the liquid crystal panel, the liquid crystal projector further provided with a first polarization plate which is arranged at an incident side of the liquid crystal panel and transmits a first polarized light converged by the illumination optical system therethrough, a second polarization plate which is arranged at an exit side of the liquid crystal panel, transmits a second polarized light modulated by the liquid crystal panel therethrough, and outputs the same to the projection lens, and an optical compensating means which has a phase delay axis in a required axial direction which is arranged at a required angle with respect to the polarization axis of the first or second polarization plate.

The present invention therefore provides, between the liquid crystal panel and a polarization plate, a phase difference means having one of a phase delay axis or a phase forward axis which is orthogonal to a polarization axis of the first or second polarization plate and arranged inclined by a predetermined angle about an axis of rotation comprised of an axis parallel to the polarization axis of the first or second polarization plate in the plane in which the first or second polarization plate is formed or provides, between the liquid crystal panel and a polarization plate, an optical compensating means which has a phase delay axis or phase forward axis in a required axial direction and arranged at a required angle with respect to the polarization axis of the first or second polarization plate.

Due to this, it is possible to obtain a beam of light in the polarization direction corresponding to a pretilt angle at an interface of an orientation film of the liquid crystal panel and possible to improve the light blocking property of the liquid crystal panel and thereby improve the contrast.

BRIEF DESCRIPTION OF THE DRAWINGS

These and other objects and features of the present invention will become clearer from the following description of the preferred embodiments given with reference to the attached figures, in which:

FIGS. 5A and 5B are views explaining examples of the configuration of the liquid crystal panel portion of the present embodiment;

FIGS. 6A and 6B are views explaining examples of other configurations of the liquid crystal panel portion of the present embodiment;

FIG. 22 is a view showing by numerical values the improvement ratio and contrast corresponding to the inclination angle α shown in FIG. 21;

FIG. 24 is a view showing by numerical values the improvement ratio, contrast, and black level intensity corresponding to the inclination angle a shown in FIG. 23;

FIG. 26 is a view showing by numerical values the improvement ratio and the contrast corresponding to the inclination angle α shown in FIG. 25;

DESCRIPTION OF THE PREFERRED EMBODIMENTS

Figure 1:
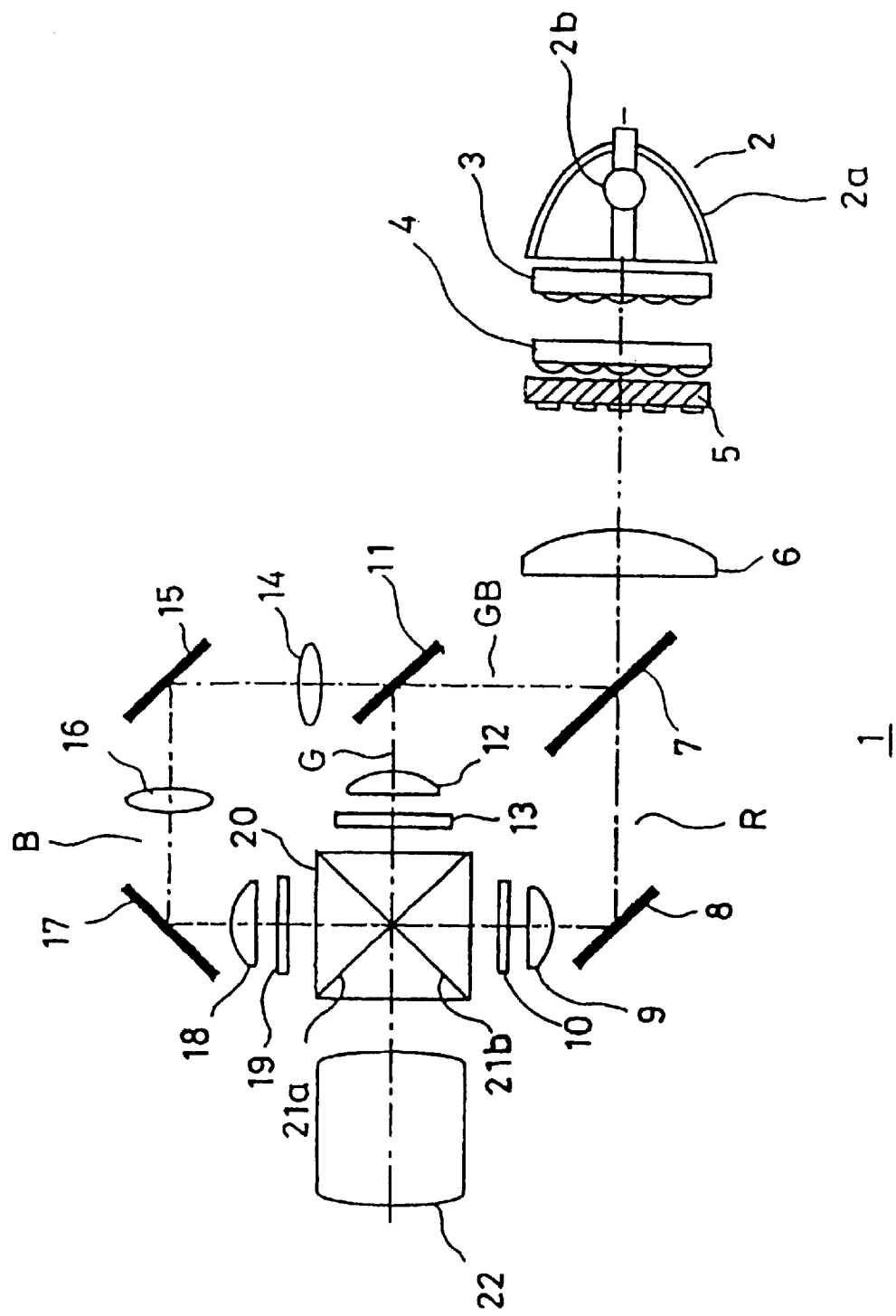
FIG. 1 is a block diagram for explaining an example of the configuration of a liquid crystal projector provided with the transmission type liquid crystal panel according to an embodiment of the present invention.

Below, embodiments of the present invention will be explained in the following order:

1. Configuration of Liquid Crystal Projector
2. Configuration of Liquid Crystal Panel Portion
3. Setting of Inclination Angle
4. Inclination Angle Adjustment Jig
5. Transmittance Simulation Results
6. Other Embodiments
1. Configuration of Liquid Crystal Projector FIG. 1 is a view for explaining an example of the configuration of an optical system of a three-panel type liquid crystal projector configured by using one liquid crystal panel for each of the R, G, and B colors (hereinafter simply referred to as a "liquid crystal projector")

In a liquid crystal projector 1 shown in this figure, a lamp 2 is comprised of a reflector 2a and a light emitting portion 2b arranged at a focus position of the reflector. The light emitted from the lamp 2 is emitted forward from its opening as light substantially parallel to the optical axis of the reflector 2a.

After the lamp 2 are arranged a multi-lens array 3 comprised of a plurality of lens cells, each having an outer shape forming a similar shape substantially equal to an aspect ratio of an irradiated area of a liquid crystal panel (corresponding to an effective aperture for optical modulation for forming an image) formed by for example twist nematic liquid crystals and configuring the later explained liquid crystal panel portions 10, 13, and 19, arranged in for example a square and a multi-lens array 4 comprised of a plurality of lens cells formed facing the lens cells of this multi-lens array 3. The light focused by these multi-lens arrays 3 and 4 is polarized to light of a predetermined polarization direction by a polarization conversion block 5. Namely, the non-polarized light (P-polarized wave+S-polarized wave) emitted from the lamp 2 passes through the polarization conversion block 5, whereby it is converted to light of a predetermined polarization direction (for example the P-polarized wave) corresponding to the liquid crystal panel portions 10, 13, and 19. Note that, an explanation of the polarization conversion block 5 is omitted.

The light converted to for example the P-polarized wave by the polarization conversion block 5 strikes a plano-convex lens 6 arranged after the polarization conversion block 5. This plano-convex lens 6 is formed so that it focuses the light from the polarization conversion block 5 and can illuminate the liquid crystal panel with a high efficiency.

The light emitted from the plano-convex lens 6, that is, the white light, first strikes a dichroic mirror 7 for transmitting red light R. There, the red light R is transmitted, while the green light G and the blue light B are reflected. The red light R transmitted through this dichroic mirror 7 is bent in its direction of advance by for example 90° by a mirror 8 and guided via a convex plano lens 9 to the liquid crystal panel portion 10.

On the other hand, the green light G and the blue light B reflected at the dichroic mirror 7 are separated by a dichroic mirror 11 transmitting the blue light B therethrough. Namely, the green light G is reflected and guided to the liquid crystal panel portion 13 via the convex plano lens 12. Further, the blue light B passes through the dichroic mirror 11 and proceeds straight and then is guided to the liquid crystal panel portion 19 via a relay lens 14, a mirror 15, a relay lens 16, a mirror 17, and a convex plano lens 18.

The light beams optically modulated at the liquid crystal panel portions 10, 13, and 19 strike a cross prism 20.

The cross prism 20 is formed in outer shape by joining for example a plurality of glass prisms. The joining surfaces of each glass prism are formed with interference filters 21a and 21b having predetermined optical characteristics. For example, the interference filter 21a is configured so as to reflect the red light R but transmit the green light G therethrough, while the interference filter 21b is configured so as to reflect the blue light B but transmit the green light G therethrough.

Accordingly, the red light R is reflected in the direction of the projection lens 22 by the interference filter 21a and the blue light B by the interference filter 21b. The green color light G passes through the interference filters 21a and 21b so as to reach the projection lens 22, where the light beams are combined to one optical axis.

Figure 28:
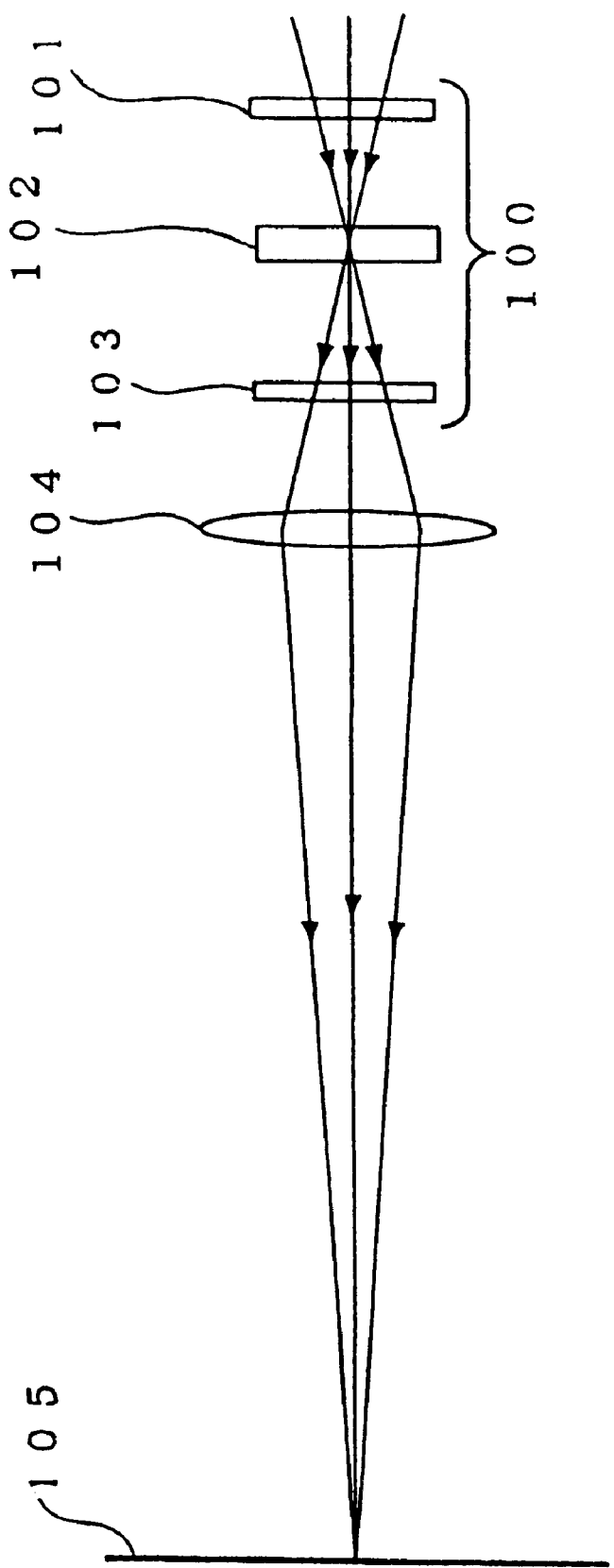
FIG. 28 is a view explaining the procedure for the modulation of light from the lamp in the liquid crystal panel.

The basic procedure for modulating the light from the lamp 2 in the liquid crystal panels is as shown in for example FIG. 28. Note that, in FIG. 28, different reference numerals are attached even to parts identical to those of FIG. 1 for convenience. The liquid crystal panel portion 100 corresponds to the liquid crystal panel portions 10, 13, and 19. The liquid crystal panel portion 100 is comprised of a polarization plate 101 on the incident side and a liquid crystal panel 102 and a polarization plate 103 on the exit side.

All light striking the pixels of the liquid crystal panel 102 is optically modulated at the pixels and magnified and projected on the screen 105 by a projection lens 104. That is, in a state where for example a drive signal (video signal) for displaying the black level is supplied to the liquid crystal panel 102, if the light blocking performance of the liquid crystal panel 102 is poor due to the incident angle in the range of distribution of the angle of spread of the light (optical image) focused on the screen 100, light which originally must not be transmitted will reach the screen 105. Accordingly, on the screen 105, an image in which the contrast is lowered and so-called black color whitening occurs is formed.

2. Configuration of Liquid Crystal Panel Portion

Figure 2:
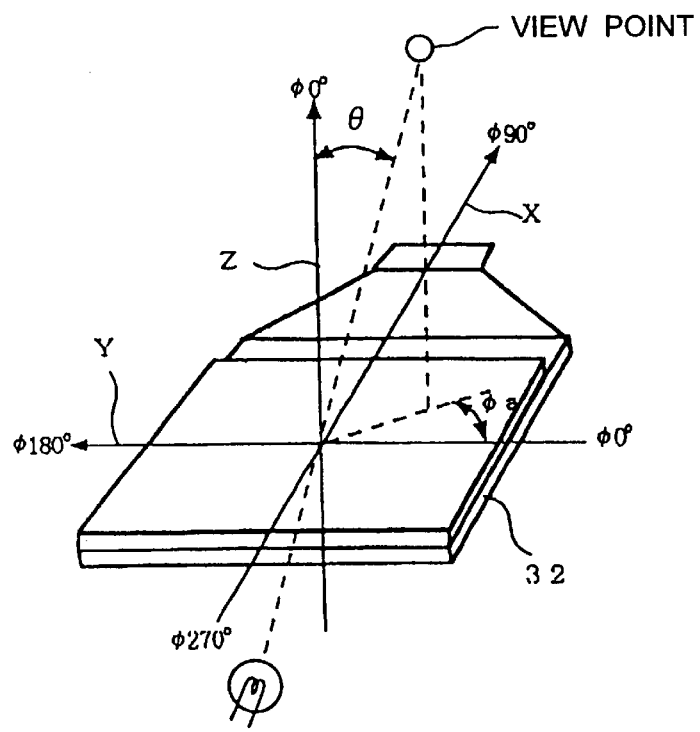
FIG. 2 is a view for explaining the direction of the light striking a liquid crystal panel.
Figure 3:
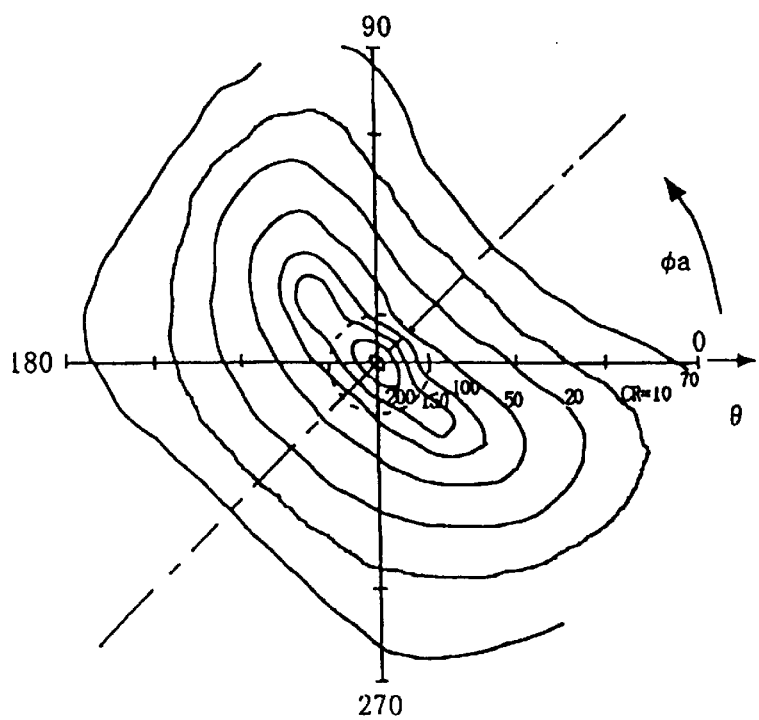
FIG. 3 is a view showing by contour lines the viewing angle characteristic of light striking the liquid crystal panel shown in FIG. 2 from a predetermined direction.

FIG. 2 is a perspective view of a liquid crystal panel 32 formed in the liquid crystal panel portions 10, 13, and 19, and FIG. 3 is a view showing by contour lines the viewing angle characteristic of light striking the liquid crystal panel shown in FIG. 2 from predetermined directions.

As will be understood from FIG. 3, the part in which the contrast becomes the maximum for a viewing angle is, as indicated by the broken-line circle, a very narrow range. Further, FIG. 3 shows the viewing angle characteristic of light which strikes, as shown by the direction of incidence of light shown in FIG. 2, at an angle inclined by θ from the z-axis and rotated by φa about the z-axis starting from the y-axis, as indicated by the broken lines. It is seen that the contrast is lowered in the direction of the arrow up to the one-dot chain line.

Figure 4:
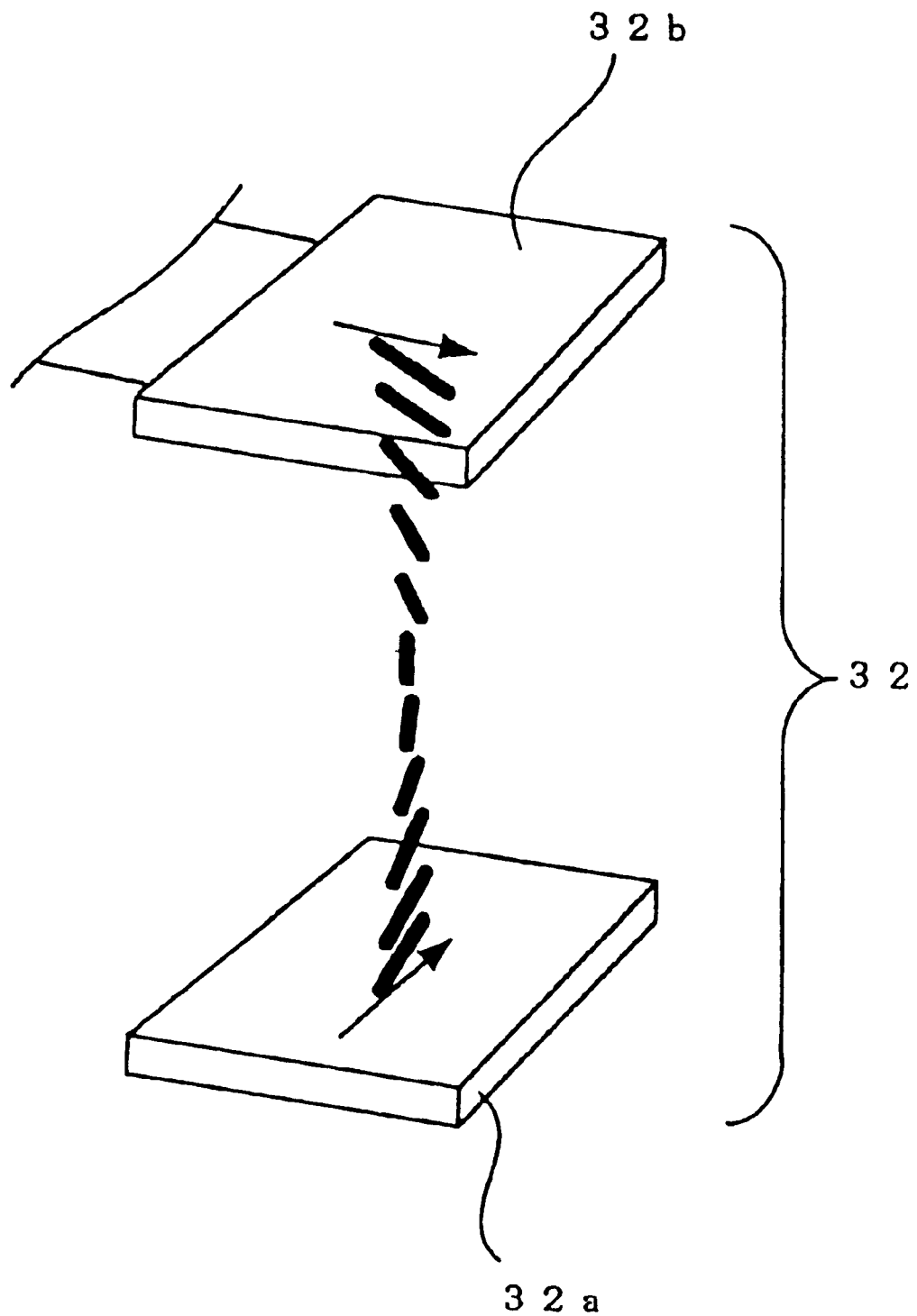
FIG. 4 is a view explaining the pretilt angle of liquid crystal molecules in an orientation film of the liquid crystal panel.

As a factor causing the viewing angle characteristic shown in FIG. 3, there can be mentioned the fact that the twist nematic liquid crystal (hereinafter referred to as the "TN liquid crystal") molecules constituting the liquid crystal panel are twisted as shown in FIG. 4.

FIG. 4 shows for example an arrangement of liquid crystal molecules of a normally white liquid crystal panel 32. The arrows indicated by solid lines in the orientation films 32a and 32b show the alignment directions. When a required driving voltage is applied to the liquid crystal panel 32 constituted in this way, the liquid crystal molecules start to rise from the illustrated state, and the incident light is blocked.

At the interface of the orientation films 32a and 32b, the direction of orientation of the liquid crystal molecules has a predetermined angle, referred to as a "pretilt angle", with respect to the alignment direction. This is the angle of the initial molecular orientation given with respect to the alignment direction in order to obtain the drive direction of the liquid crystal molecules at the time of application of the driving voltage.

By applying the driving voltage to such a liquid crystal panel to raise the liquid crystal molecules, it becomes possible to display the black level. However, the viewing angle blocking performance deteriorates due to the influence of the pretilt angle, so the black color whitening phenomenon occurs.

For this reason, in the present embodiment, for example a phase difference film serving as a phase difference means or a viewing angle enlargement film used as an optical compensating means is arranged between a polarization plate and the liquid crystal panel so as to correct the phase in accordance with the pretilt angle and improve the light blocking performance of the liquid crystal panel.

FIGS. 5A and 5B are schematic views for explaining examples of the configuration of the liquid crystal panel portion 10 of the present embodiment and show the example of a case where a rubbing direction of the orientation film 32a is set to 0° inside the plane with respect to the edge of the liquid crystal panel 32 and where the rubbing direction of the orientation film 32b is similarly set to 90°. Note that these figures show examples of the configuration of the liquid crystal panel portion 10, but similar configurations are employed for also the liquid crystal panel portions 13 and 19 shown in FIG. 1. Further, the light is made to strike the liquid crystal panel portion 10 from below the paper surface.

FIG. 5A is a view of an example in which for example a phase difference film 31 is arranged as the phase difference means.

A first polarization plate 30 arranged on the incident side has a polarization axis in for example the x-axis direction. The light passing through the polarization plate 30 reaches the phase difference film 31. This phase difference film 31 has one of a phase delay axis or a phase forward axis which is orthogonal to the polarization axis of the polarization plate 30 and is arranged inclined by a predetermined angle with respect to an axis of rotation comprised of an axis parallel to the polarization axis of the polarization plate 30 in the plane in which the phase difference film 31 is formed. In the liquid crystal panel 32, in the same way as the case shown in FIG. 4, the alignment direction of the orientation film 32a is made the x-axis direction, and the alignment direction of the orientation film 32b is made the y-axis direction. The liquid crystal molecules are aligned with the required pretilt angle as shown in the orientation films 32a and 32b. Accordingly, the polarization axis of the polarization plate 30 and the alignment of the liquid crystal molecules have an angular difference based on the pretilt angle. The phase difference film 31 corrects this angular difference and brings the phase of the light transmitted through the polarization plate 30 into register with the alignment of the liquid crystal molecules of the orientation film 32a having the pretilt angle. Note that the angle of arrangement of the phase difference film 31 will be explained in detail later.

The light optically modulated by interposing the liquid crystal panel 32 reaches the cross prism 20, not shown in this figure, via the second polarization plate 33 arranged on the exit side.

Further, as shown in FIG. 5B, a similar effect can be obtained even if a viewing angle enlargement film 35 is arranged in place of the phase difference film 31. In this case, the viewing angle enlargement film 35 may be configured so that the phase delay axis in the required axial orientation can be arranged with the required angle with respect to the polarization axis of the polarization plate 30 so as to give retardation (phase delay) in three axial directions (x-axis, y-axis, z-axis) equivalent to the phase difference film 31.

In FIGS. 5A and 5B, it becomes possible to correct the phase in accordance with the pretilt angle of for example the orientation film 32a.

Note that the angle of arrangement of the phase difference film 31 can be set for every liquid crystal panel portion (10, 13, 19). Similarly, the viewing angle enlargement film 35 can be configured for the specific liquid crystal panel portions (10, 13, 19).

Further, FIGS. 6A and 6B show examples of the case where the rubbing direction is made 45° in the plane with respect to the edge of the liquid crystal panel 42 in both of for example orientation films 42a and 42b as other examples of the liquid crystal panel portion 10a. Namely, corresponding to this, the polarization axes of a first polarization plate 40 and a second polarization plate 43 have an inclination of 45° with respect to the x-axis.

The phase difference film 41 shown in FIG. 6A is shown in the state rotated by for example 45° with respect to the phase difference film 31 shown in FIG. 5A and is arranged in the state where for example the phase delay axis is orthogonal to the polarization axis of the polarization plate 40 and it is inclined with respect to an xy plane about the phase forward axis. Further, as shown in FIG. 6B, a viewing angle enlargement film 45 also has a configuration in which the phase delay axis and the phase forward axis are formed corresponding to the direction of arrangement of the phase difference film 41.

As shown in FIGS. 5A and 5B and FIGS. 6A and 6B, in the present invention, by arranging for example the phase difference film or the viewing angle enlargement film in the liquid crystal panel portion between the polarization plate and the liquid crystal panel, the pretilt angle of the liquid crystal molecules in the orientation film of the liquid crystal panel can be dealt with. Due to this, it becomes possible to improve the light blocking property in the liquid crystal panel and improve the contrast. Further, the phase difference film is provided for every liquid crystal panel, so the contrast can be improved for each of the R, G, and B colors. Accordingly, it becomes possible to obtain the optimum contrast even with respect to for example the blue liquid crystal panel having a strong light intensity in which the deterioration of the contrast is large. Due to this, it becomes possible to adjust the white balance after setting individual contrasts for the three R, G, and B colors.

Note that, in FIGS. 5A and 5B and FIGS. 6A and 6B, examples in which for example only the phase difference film 31 for the pretilt angle at the interface of the orientation film 32a on the incident side was arranged were explained, but it is also possible to deal with the pretilt angle at the interface of the orientation film 32b on the emission side.

Figure 7A:
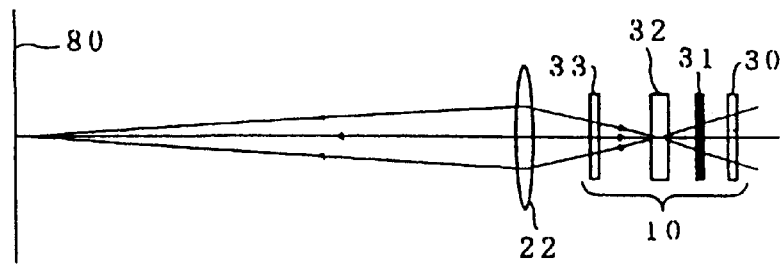
FIGS. 7A to 7E are views explaining positions of arrangement of the phase difference film in the liquid crystal panel portion.

FIGS. 7A to 7E are plan views of examples of arrangement of for example the phase difference film in the liquid crystal panel portion 10. FIG. 7A corresponds to an example shown in FIGS. 5A and 5B and shows the example in which the phase difference film 31 is arranged between the first polarization plate 30 and the liquid crystal panel 32.

Figure 7B:
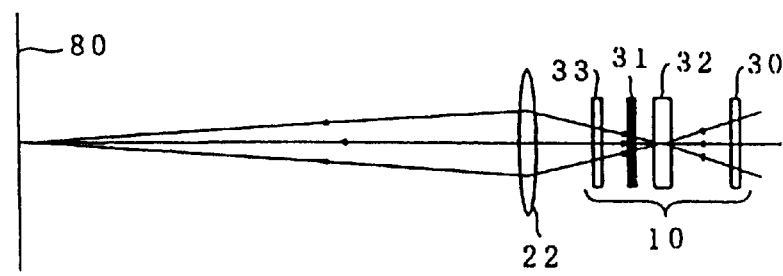

FIG. 7B shows an example in which the phase difference film 31 is arranged between the liquid crystal panel 32 and the second polarization plate 33. In this case as well, the phase difference film 31 has one of its phase delay axis or phase forward axis orthogonal to the polarization axis of the polarization plate 33 and is arranged inclined by a predetermined angle about an axis of rotation comprising an axis parallel to the polarization axis of the polarization plate 33 in the plane in which the phase difference film 31 is formed.

Figure 7C:
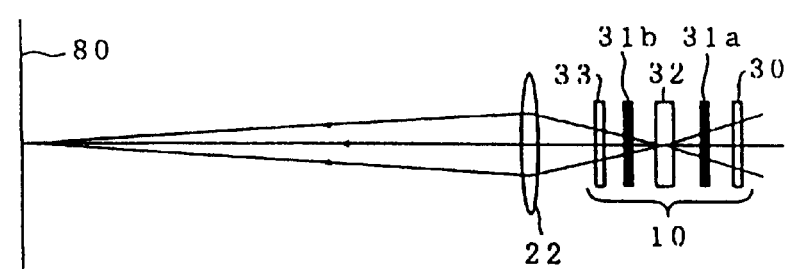

The example shown in FIG. 7C is an example in which phase difference films 31a and 31b are arranged on the incident side and the exit side of the liquid crystal panel 32. In the case of this example, the phase difference film 31a is arranged so that its phase delay axis is orthogonal to the polarization axis of the polarization plate 30 and is arranged inclined by a predetermined angle about an axis of rotation comprising an axis parallel to the polarization axis of the polarization plate 30 in the plane in which this phase difference film 31a is formed. Further, the phase difference film 31b is arranged so that its phase forward axis is orthogonal to the polarization axis of the polarization plate 33 and is arranged inclined by a predetermined angle about an axis of rotation comprising an axis parallel to the polarization axis of the polarization plate 33 in the plane in which this phase difference film 31b.

Further, in this example, the phase difference film 31a may also be arranged so that its phase forward axis is orthogonal to the polarization axis of the polarization plate 30, and the phase difference film 31b may also be arranged so that its phase delay axis is orthogonal to the polarization axis of the polarization plate 33.

Figure 7D:
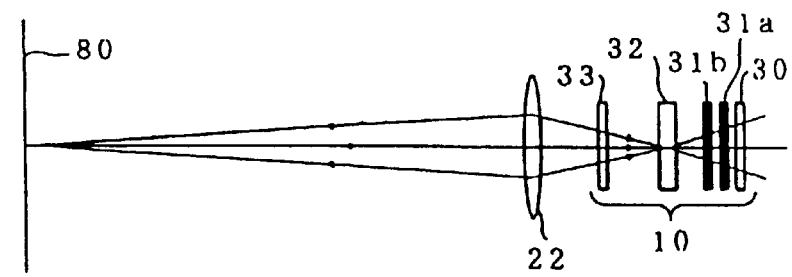
Figure 7E:
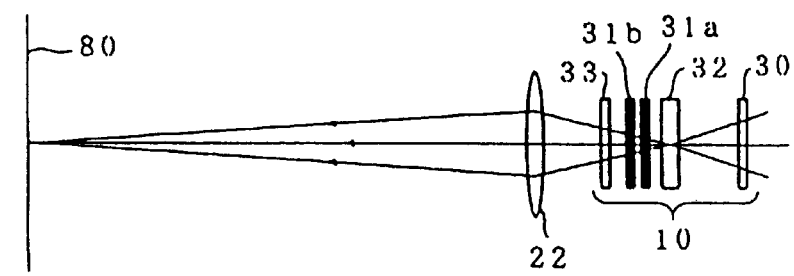

The example shown in FIG. 7D is an example in which the phase difference films 31a and 31b are arranged on the incident side of the liquid crystal panel 32, while the example shown in FIG. 7E is an example in which the phase difference films 31a and 31b are arranged on the exit side of the liquid crystal panel 32.

In the cases of these examples, the phase difference film 31a is arranged so that its phase delay axis is orthogonal to the polarization axis of the polarization plate 30 and is arranged inclined by a predetermined angle about an axis of rotation comprising an axis parallel to the polarization axis of the polarization plate 30 in the plane in which the phase difference film 31a is formed.

Further, the phase difference film 31b is arranged so that its phase delay axis is orthogonal to the polarization axis of the polarization plate 33 and is arranged inclined by a predetermined angle about an axis of rotation comprised of an axis parallel to the polarization axis of the polarization plate 33 in the plane in which this phase difference film 31b is formed.

Further, in this example, the phase difference film 31a may also be arranged so that its phase forward axis is orthogonal to the polarization axis of the polarization plate 30, and the phase difference film 31b may also be arranged so that its phase forward axis is orthogonal to the polarization axis of the polarization plate 33.

Further, while FIGS. 7A to 7E show positions for arranging the phase difference film 31, these examples of arrangement may also be applied to the viewing angle enlargement film 35 shown in FIGS. 5A and 5B and the phase difference film 41 and the viewing angle enlargement film 45 shown in FIGS. 6A and 6B.

3. Setting of Inclination Angle

Figure 8A:
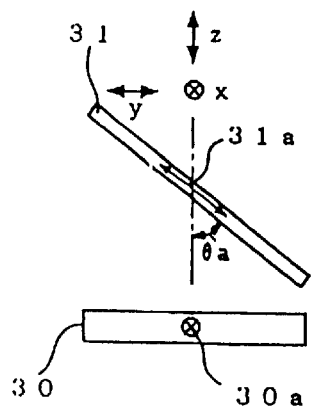
FIGS. 8A to 8E are views explaining by plan views the displacement of the phase delay axis of the phase difference film corresponding to the direction of incidence of the light.
Figure 8C:
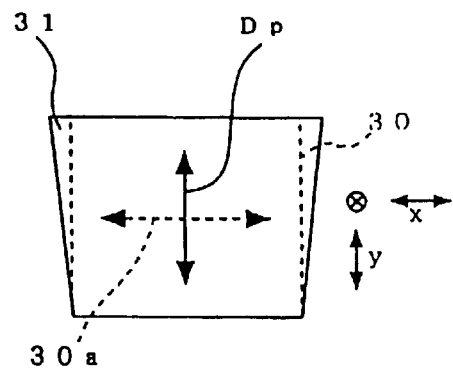
Figure 8B:
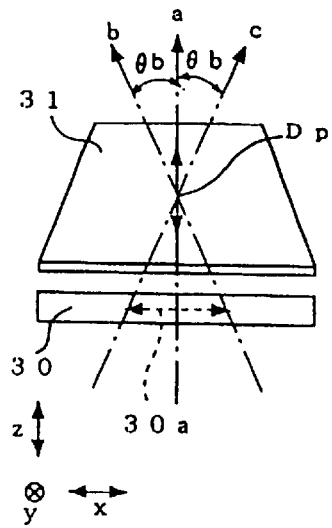
Figure 9:
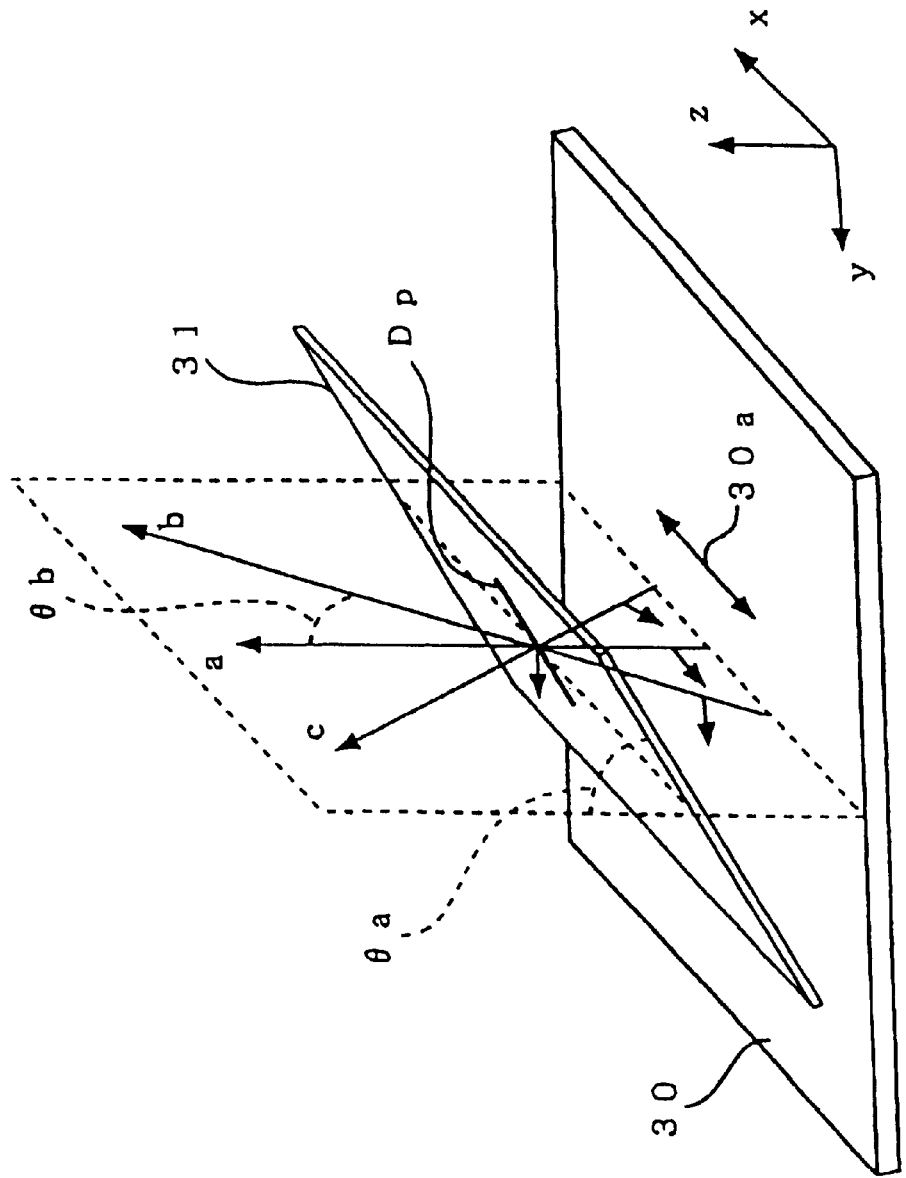
FIG. 9 is a view explaining by a perspective view the displacement of the phase delay axis of the phase difference film corresponding to the direction of incidence of the light.

FIGS. 8A and 8B and FIG. 9 are schematic views for explaining the case of setting the angle of arrangement of the phase difference film 31. FIGS. 8A and 8B are plan explanatory views, while FIG. 9 is a perspective explanatory view.

FIGS. 8A and 8B show the polarization plate 30 and the phase difference film 31 from the side and back. That is, FIG. 8A is a view of the state where they are viewed from the x-axis direction in FIG. 9, and FIG. 8B is a view of the state where they are viewed from the y-axis direction in FIG. 9. Note that reference numeral 30a is attached to the polarization axis (broken line arrows) of the polarization plate 30 in these figures, and reference numeral 31a is attached to the phase delay axis (or phase forward axis . . . solid line arrows) of the phase difference film 31.

As shown in FIG. 8A and FIG. 9, the phase difference film 31 has an axis which is orthogonal to the polarization axis 30a of the polarization plate 30 and is arranged at a predetermined inclination angle θa about an axis of rotation comprised of an axis parallel to the polarization axis 30a in the plane where the phase difference film 31 is formed.

Consider a case where a beam of light a, a beam of light b, and a beam of light c strike from three directions under such an arrangement state as shown in FIG. 8B and FIG. 9. These three beams of light are assumed to have optical paths in an xz plane parallel to the polarization axis 30a as shown in FIG. 9. The beam of light a is made to vertically strike the polarization plate 30. The beams of light b and a are made light beams having the required angle θb in the xz plane with respect to the beam of light a.

FIG. 8C shows the state where the beam of light a is viewed from the exit side of the phase difference film 31, that is, from the liquid crystal panel 32 side. As seen from this figure, the polarization axis 30a and the phase delay axis Dp are orthogonal.

Figure 8D:
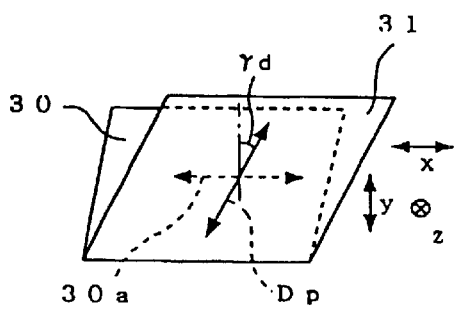

Further, FIG. 8D shows the state where the beam of light b is viewed from the liquid crystal panel 32 side similar to FIG. 8C. In the example shown in FIG. 8D, the beam of light b is inclined, so the polarization axis 31a appears to be displaced to the right direction on the paper surface. The polarization direction of the beam of light b always corresponds to the polarization axis 30a, therefore the state where it and the phase delay axis are orthogonal is exhibited. Accordingly, the phase delay axis 30a appears to be rotated in the right direction by exactly an angle γd with respect to the polarization direction.

In this case, if the retardation (phase delay) of the phase difference film 31 is for example a whole multiple of λ/2, the phase delay axis 30a will rotate while keeping the straight polarization as it is. However, when the retardation is not a whole multiple of λ/2, an electric field of the phase delay axis component is created and a right-handed polarized wave is generated.

Figure 8E:
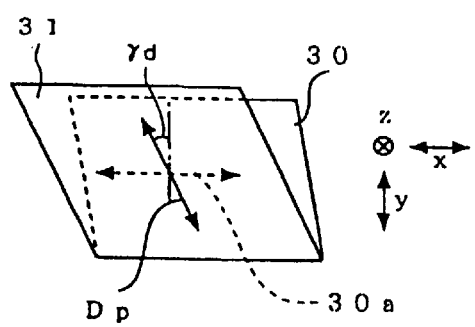

Similarly, FIG. 8E shows the state where the beam of light c is viewed from the liquid crystal panel 32 side. In the example shown in FIG. 8E, conversely to the case shown in FIG. 8D, the polarization axis 31a appears to be displaced to the left direction on the paper surface, and the polarization axis 30a appears to be rotated in the left direction by exactly the angle γd with respect to the polarization direction. That is, a left-handed polarized wave is created by the creation of the electric field of the phase delay axis component.

Accordingly, the inclination angle of the phase difference film 31 (inclination angle of the phase delay axis) θa should be set to an angle at which the left-handed/right-handed polarized wave shown in FIGS. 8D and 8E are brought into register with the pretilt angle in the orientation films 32a and 32b of the liquid crystal panel 32. Namely, by adjusting the retardation and the inclination angle of the phase difference film 31, it becomes possible to reversely correct the viewing angle characteristic created by the pretilt angle. Note that if the phase delay axis Dp of the phase difference film 31 is replaced by the phase forward axis (not illustrated) orthogonal to this phase delay axis Dp, the reverse-handed polarized waves can be obtained.

Here, the relationships among the incident angle θ of the beam, the inclination of the phase delay axis of the phase difference film 31, and a polarized wave electric field component E cos γ will be explained according to FIG. 10.

Figure 10:
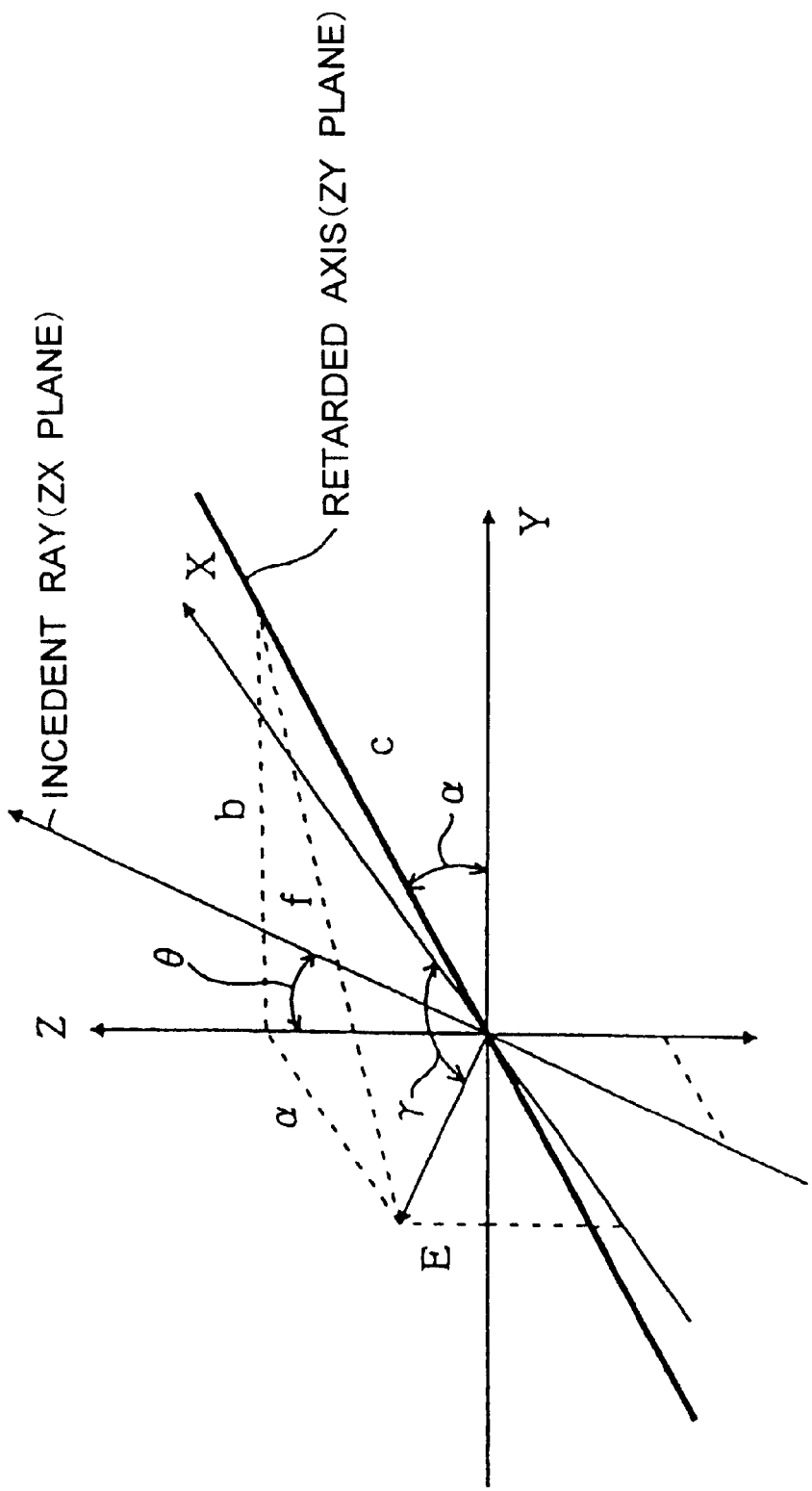
FIG. 10 is a view explaining the relationships among the incident angle of the light, the inclination a of the phase difference film, and the polarized wave electric field component E cos γ.

As shown in FIG. 10, when the electric field is "E", the inclination angle θa is "α", and the polarization direction is "γ", the relationships become:

$$a=E\sin(90-\theta),\ b=E\cos(90-\theta)\cdot\tan(90-\alpha)c\cdot cos(90-\alpha)=E\cos(90-\theta)f^2=a^2=b^2,\ f^2=E^2+c^2-2E\cos\gamma \quad (1)$$

From this, the electric field component E cos γ can be indicated as:

$$\cos\gamma=\sin\theta\cdot\sin\alpha \quad (2)$$

Next, an explanation will be made of the case where the viewing angle enlargement film 35 is formed based on the inclination angle of the phase difference film 31.

Figure 11:
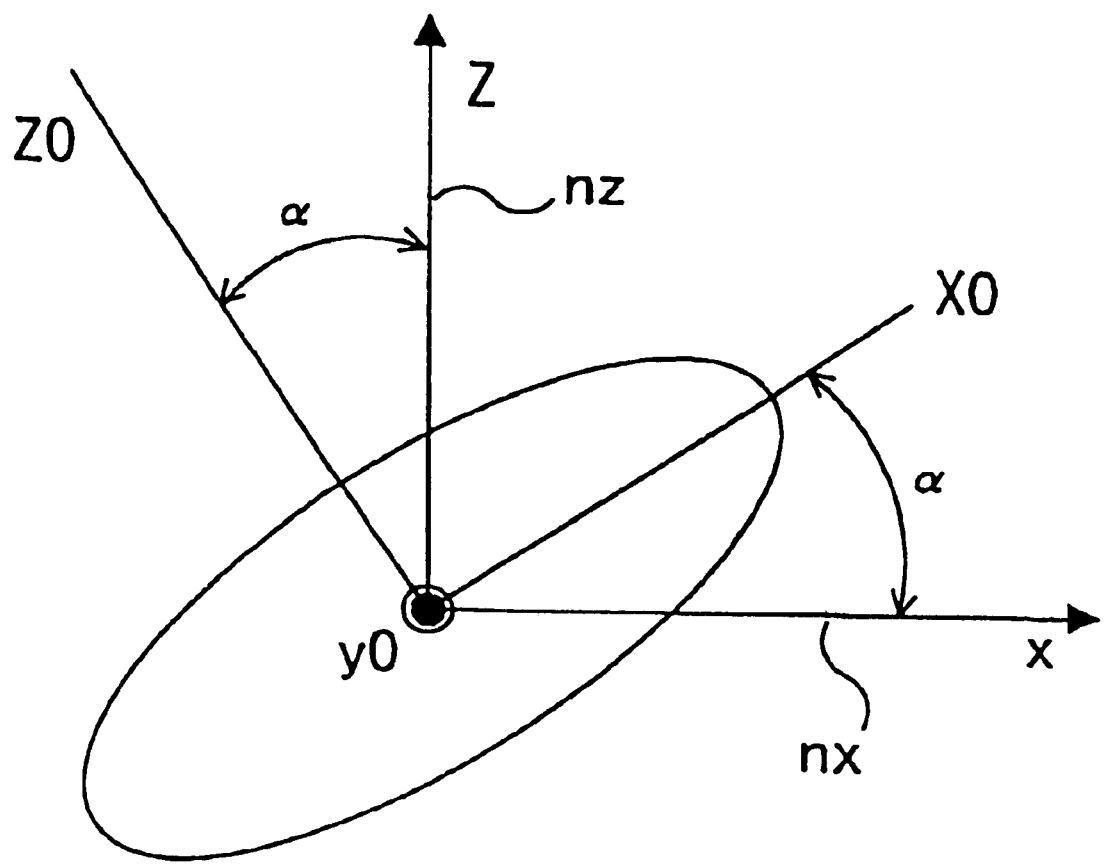
FIG. 11 is a view explaining the relationship between the refractive index of the phase difference film in the phase delay axis direction and an ellipse.

In the phase difference film 31, when a refractive index in the phase delay axis Dp direction is "ne", the refractive index in the direction orthogonal to the phase delay axis Dp is "no1", the refractive index In the normal direction of the film surface of the phase difference film 31 is "no2", the thickness is "d", and the retardation is "R0=d(ne−no1)" and the phase delay axis Dp is brought into register with the x-axis direction, the relationship between the refractive index and the ellipse shown in FIG. 11 can be indicated as:

$$\frac{x0^2}{ne2^2} + \frac{y0^2}{no1^2} + \frac{z0^2}{no2^2} = 1 \tag{3}$$

Note that the condition where the phase delay axis Dp is employed becomes:

$ne > no1 \approx no2$

Further, when considering the phase forward axis orthogonal to the phase delay axis Dp, the result is:

$no1 \approx no2 > ne'$

Note that "ne'" is the refractive index of the phase forward axis.

At this time, when assuming that the phase difference film 31 is an ellipse inclined by an inclination angle $\alpha$ about the y-axis and the refractive indexes on the x-axis, y-axis, and the z-axis are "nx", "ny", and "nz", the following is obtained:

$$\frac{nx^2 \cos^2\alpha}{ne^2} + \frac{nx^2 \sin^2\alpha}{no2^2} = 1$$

Similarly, this can be indicated as:

$$\therefore nx = \sqrt{\frac{1}{\frac{\cos^2}{ne^2} + \frac{\sin^2}{no2^2}}} = \frac{ne \cdot no2}{\sqrt{no2^2 \cdot \cos^2\alpha + ne^2 \cdot \sin^2\alpha}} \tag{4}$$

$x0 = nz \cdot \sin\alpha,\ y0 = 0,\ z0 = nz \cdot \cos\alpha$ $$nz = \frac{ne \cdot no2}{\sqrt{no2^2 \cdot \sin^2\alpha + ne^2 \cdot \cos^2\alpha}} \tag{5}$$

In this case, there is no change in the refractive index ny, so it becomes:

ny=no1

Accordingly, the retardation can be indicated as:

$$R_{xy} = \frac{d}{\cos\alpha} \cdot (nx - ny) \tag{6}$$

$$R_{zy} = \frac{d}{\cos\alpha} \cdot (nz - ny)$$

Figures 12A, 12B:
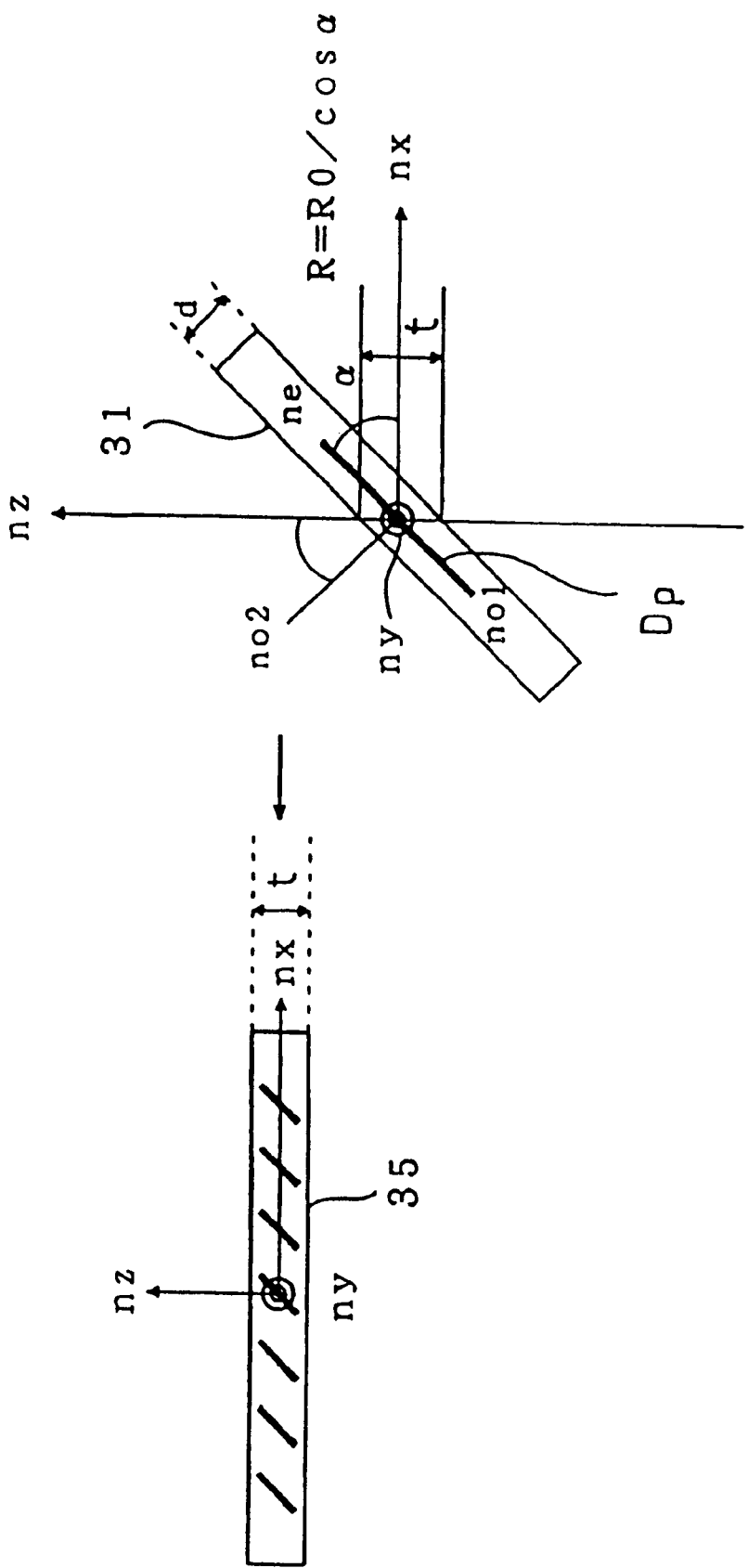
FIGS. 12A and 12B are views explaining an example of a viewing angle enlargement film arranged according to the angle of inclination of the phase delay axis of the phase difference film.

FIGS. 12A and 12B are views of an example where the viewing angle enlargement film is formed based on the optimum inclination angle obtained by the phase difference film 31. The phase difference film 31 is shown in FIG. 12A, and the viewing angle enlargement film is shown in FIG. 12B.

When the viewing angle enlargement film 35 is configured based on the phase difference film 31 shown in FIG. 12A, the refractive indexes nx, ny, and nz and the thickness t in the viewing angle enlargement film 35 can be indicated as:

$nx = ne * no2 / \sqrt{(no2 * \cos\alpha)^2 + (ne * \sin\alpha)^2}$ $ny = no1$ $nz = ne * no2 / \sqrt{(no2 * \sin\alpha)^2 + (ne * \cos\alpha)^2}$ $t = d / \cos\alpha \tag{7}$ Further, the retardation of the viewing angle enlargement film 35 can be indicated as:

$Rxy = t * (nx - ny)$ $Rzy = t * (nz - ny) \tag{8}$

Note that, the retardation is found by Equation 3 through Equation 6. Namely, the film can be utilized as an optical compensating means having the retardation in three axial directions equivalent to the phase difference means arranged inclined so as to have the required angle. Further, the method of arrangement of the phase difference film 31 as shown in for example FIG. 13 can be employed too.

In this example, a plurality of phase difference films 31 cut into strips are aligned in states inclined by the required angle to constitute a phase difference film portion. That is, the phase difference film portion need only have a thickness corresponding to at least the retardation And in the direction of advance of the light. Due to this, the depth can be reduced compared with the case where a single phase difference film 31 having a size corresponding to the area of the polarization plate 30 or the polarization plate 40 is arranged inclined as shown in FIGS. 5A and 5B and FIGS. 6A and 6B and therefore the liquid crystal panel portion can be reduced in size.

Figure 13:
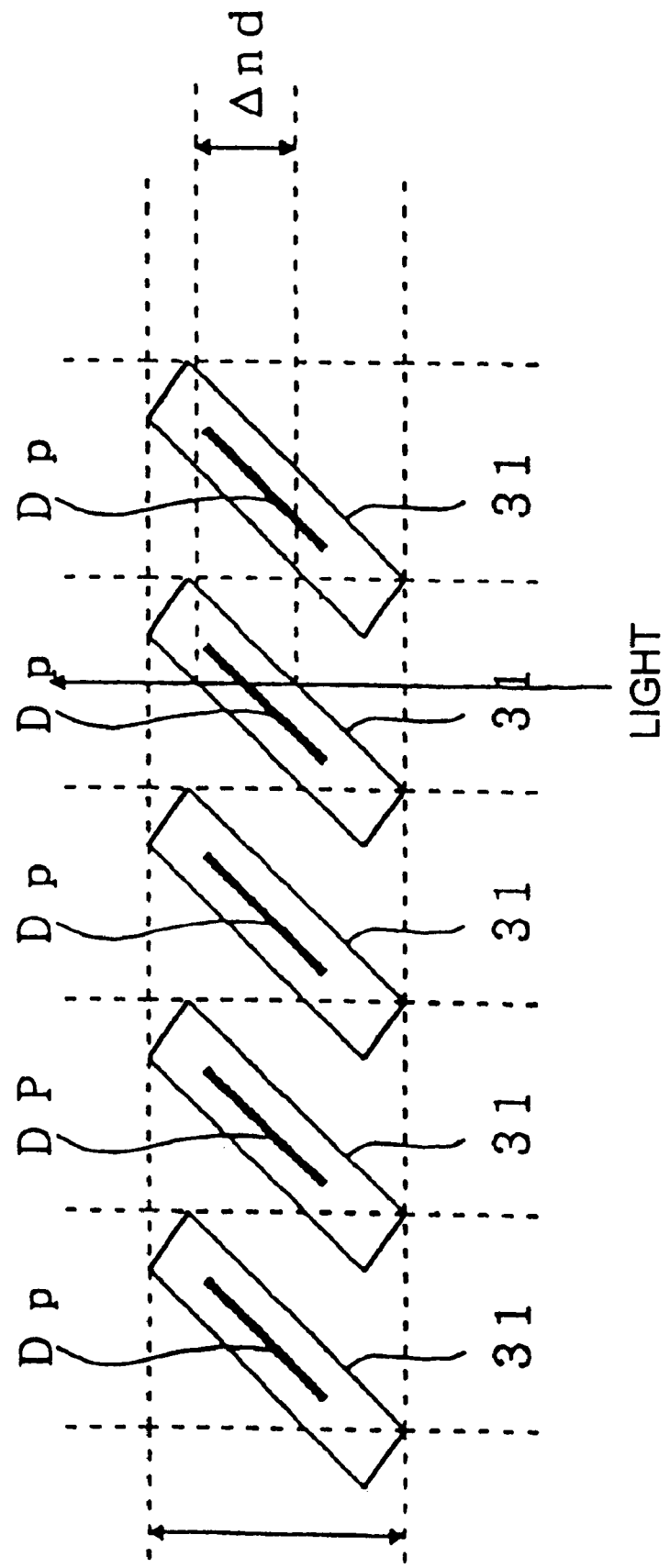
FIG. 13 is a view explaining a modification of the phase difference film.
Figure 14:
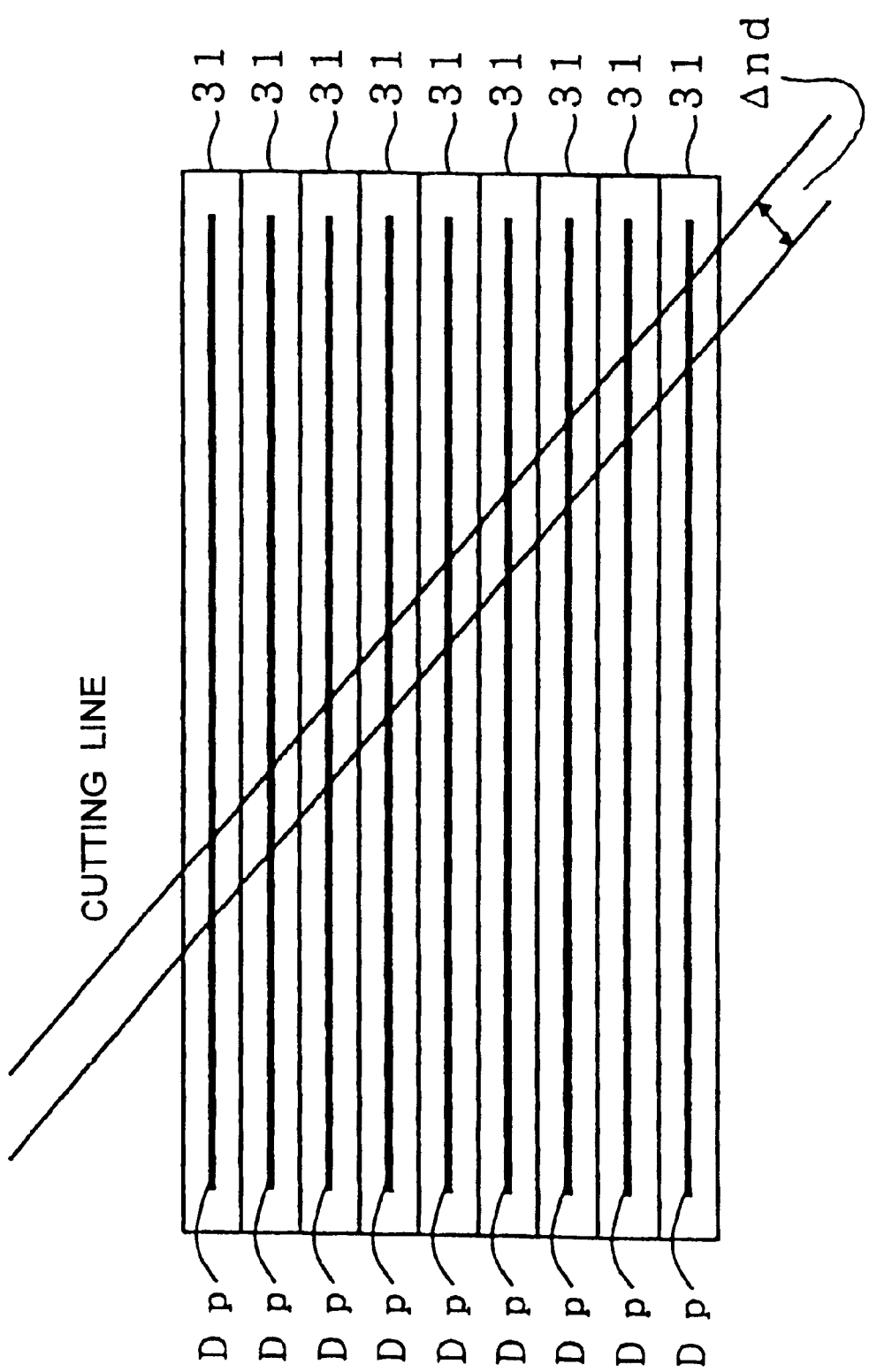
FIG. 14 is a view explaining a modification of the phase difference film.

Further, as shown in FIG. 14, a phase difference film portion in similar to the phase difference film portion shown in FIG. 13 can also be formed by laminating and bonding a plurality of phase difference films 31 and cutting them by a cutting line giving the predetermined inclination angle and the retardation Δnd.

Figure 15:
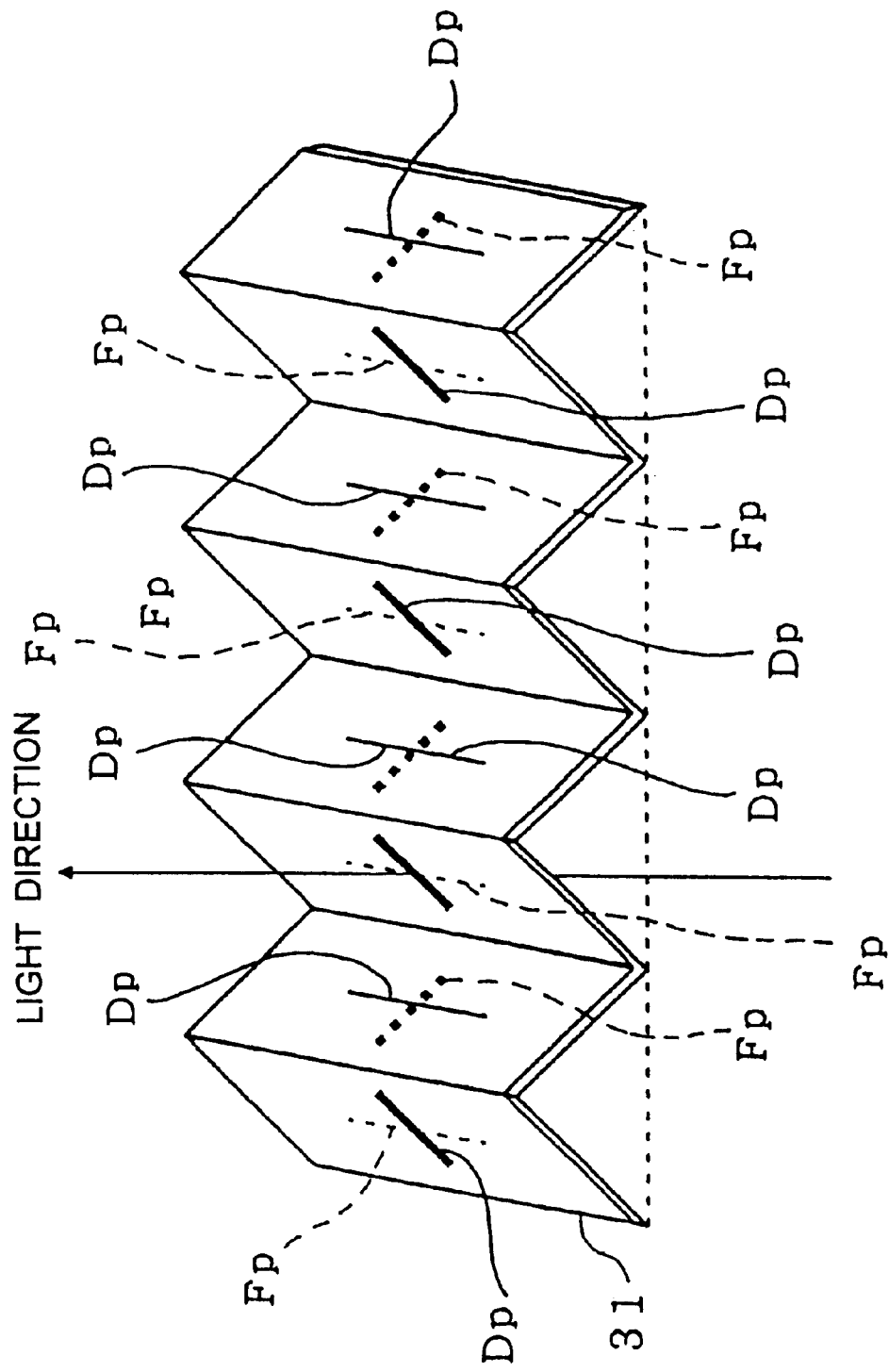
FIG. 15 is a view explaining a modification of the phase difference film.

Further, it is also possible to configure this so that the phase difference films 31 are continuously joined in an accordion manner so that the phase delay axes Dp and the phase forward axes Fp alternately become the same direction as shown in FIG. 15. By this, by using a phase difference film in which the phase delay axis Dp is replaced by the phase forward axis Fp, it becomes possible to acquire a reverse handed polarization. Accordingly, by making the direction of the inclination angle of the phase difference film 31 reverse so as to be symmetric with respect to the z-axis direction as illustrated, the polarization correction of the same direction can be carried out.

4. Inclination Angle Adjustment Jig

Figure 16A:
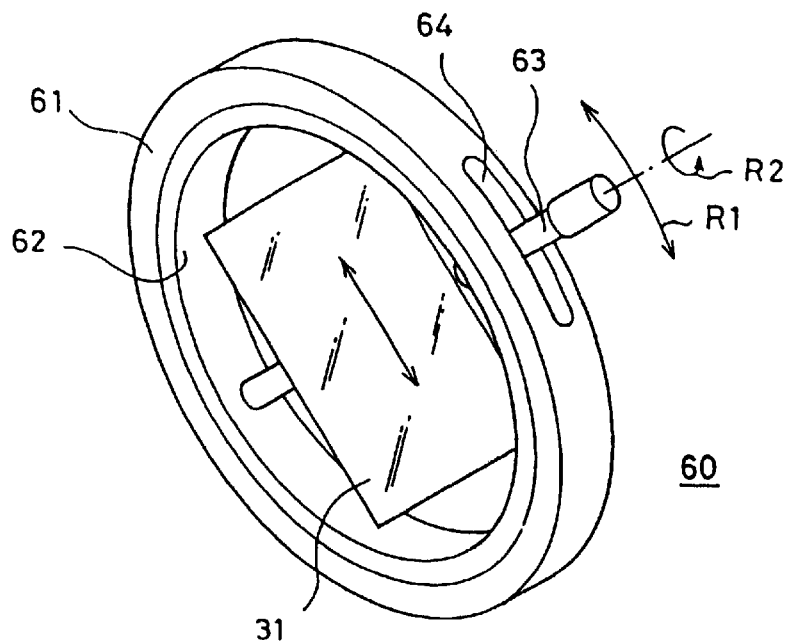
FIGS. 16A and 16B are views explaining an example of the configuration of the angle adjustment jig.
Figure 16B:
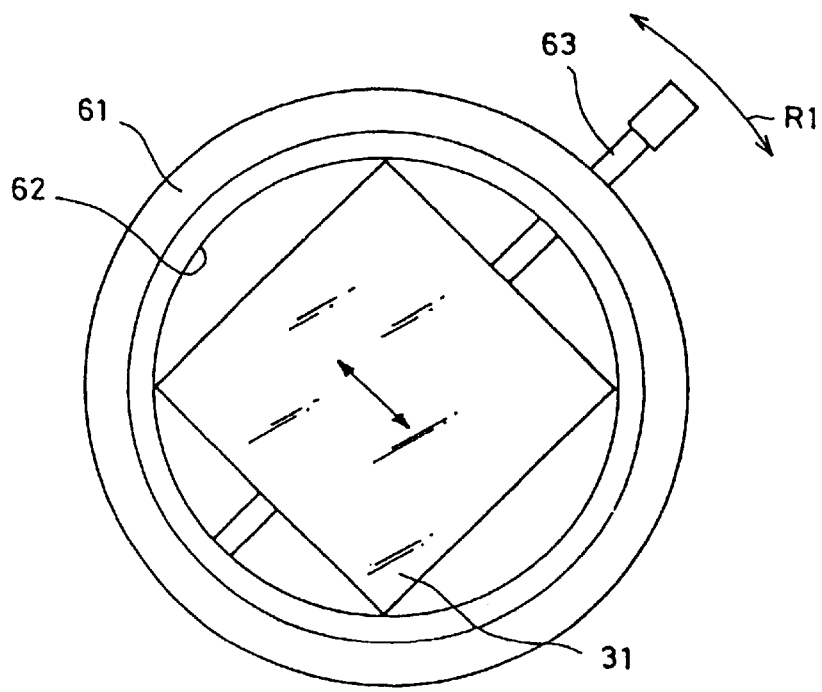

As a jig for imparting an inclination angle to a phase difference film in accordance with the orientation film of a liquid crystal panel as explained above, one of the configuration shown in for example FIGS. 16A and 16B can be mentioned.

The inclination angle adjustment jig 60 shown in this figure has an outer appearance substantially formed by a fixed ring 61 fixed at a required position of the liquid crystal panel portion and a rotating ring 62 rotatably fitted in the inner circumference of this fixed ring 61. A shaft 63 is fixed to the rotating ring 62 via a groove 64 formed in the fixed ring 61 and supports the phase difference film 31 in the Inner circumference of the rotating ring 62. Note that the arrows In the phase difference film show the polarization direction. Namely, when the shaft 63 is displaced in the direction indicated by the arrows R1, the phase difference film 31 can be rotated about the z-axis direction and therefore the phase delay axis Dp and the polarization axis of the polarization plate can be made orthogonal. Further, when the shaft 63 is rotated in the direction indicated by the arrow R2, it becomes possible to rotate the phase difference film 31 about the x-axis direction and therefore possible to impart the required inclination angle $\alpha$ to the phase difference film 31.

It is possible to impart the optimum inclination angle α by this inclination angle adjustment jig 60 and then use the liquid crystal projector in that state. It is also possible to use this inclination angle adjustment jig 60 in only the process of adjusting the inclination angle α and to form the phase difference film portion and the viewing angle enlargement film 35 explained by for example FIGS. 12A and 12B through FIG. 15 by the inclination angle α based on this adjustment. In this case, the inclination angle adjustment jig 60 may be detached after the adjustment of the inclination angle α and then the angle measured or gradations or the like indicating the angle may be provided in the groove 64.

It is also possible to use such an inclination angle adjustment jig 60 to adjust the angle of arrangement of the phase difference film while viewing a required image projected on for example a screen and thereby search for the direction of arrangement of for example the phase delay axis Dp (or the phase forward axis Fp) corresponding to the pretilt angle. Accordingly, the optimum direction of arrangement of the phase delay axis Dp (or the phase forward axis Fp) with respect to the liquid crystal panel can be grasped, and the phase difference means shown in FIG. 12A to 12B through FIG. 15 can be formed based on the direction of arrangement of this phase delay axis Dp. Further, it becomes possible to configure an optical compensating means (viewing angle enlargement film) corresponding to the pretilt angle in accordance with the angle of arrangement of the phase delay axis.

5. Results of Transmittance Simulation

Figure 17:
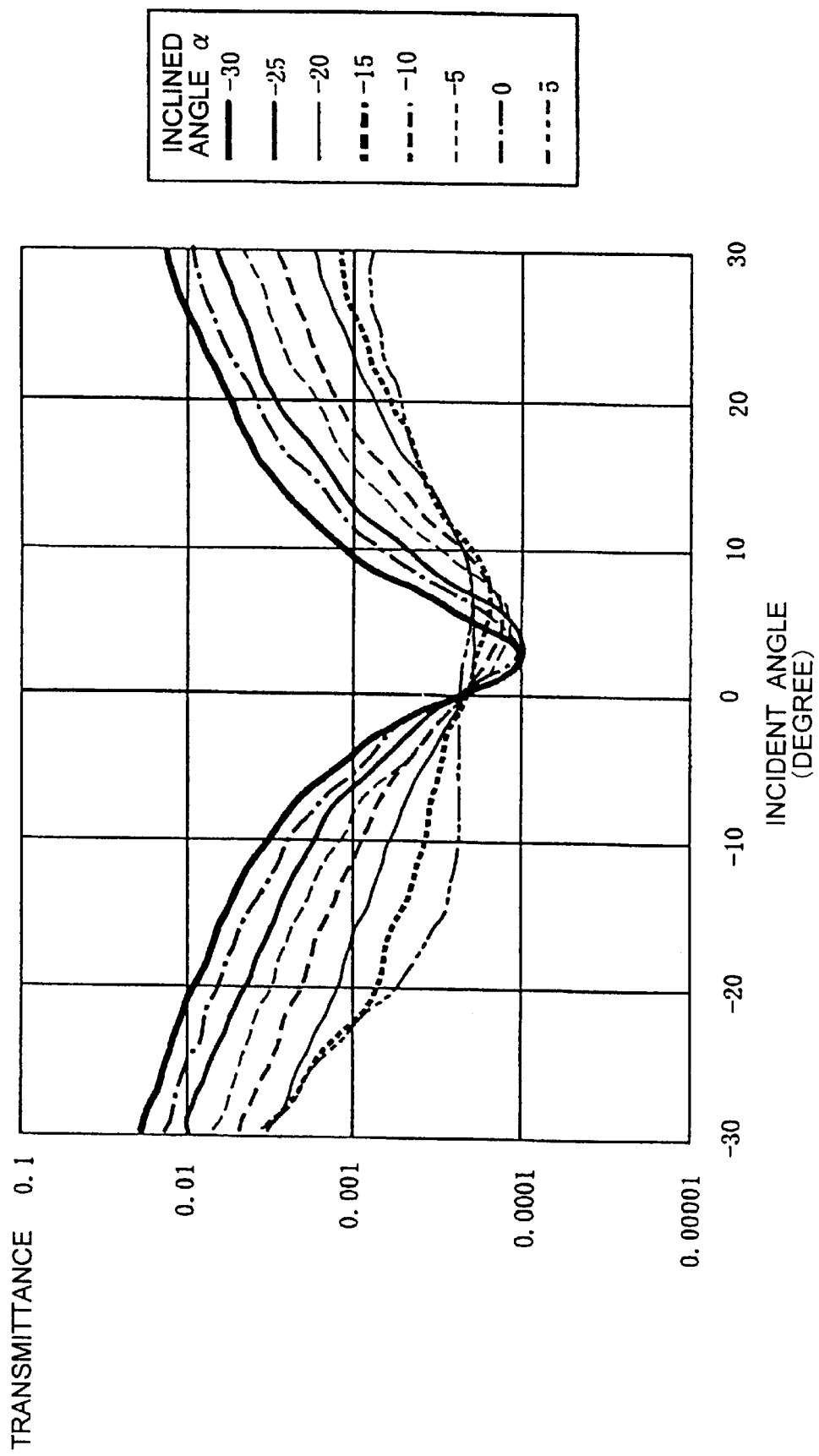
FIG. 17 is a view showing the transmittance of the black level when using a λ/4 phase difference film as the incident angle dependency about the y-axis direction.

FIG. 17 shows an example of simulation of the transmittance at the time of black level drive for different angles of arrangement (5° to −30°) when a phase difference film with for example a retardation Δnt of λ/4 is arranged with a required inclination about the y-axis. The transmittance of the light is plotted on the ordinate, an incident angle deg of the light is plotted on the abscissa, and the angles of arrangement of the phase difference film 31 are differentiated by the types of lines. Note that the phase difference film 31 is made one of Δnt=λ/4, and the passing distance of the light is slightly somewhat off at the time of inclination. Accordingly, the state where the phase difference film 31 is inclined is indicated by λ/4.

Further, this simulation is carried out using a liquid crystal simulator (LCD MASTER) made by Syntec Corporation as an example. Using the values of the dielectric constant (∈11, ∈22, ∈33) of a TN liquid crystal, elastic constants (K11, K22, K33), rotational viscosity, helical pitch, and a pretilt angle TN cell gap length at the orientation film surface, the distribution of the liquid crystal director in the case of applying the required driving voltage was calculated. Based on that distribution, by using an ordinary light refractive index (no) and an extraordinary light refractive index (ne) of the liquid crystal, the incident angle dependency of the transmittance of light (550 n) propagated in an optical model combining the phase difference film and the polarization plate was found by a 4×4 matrix method.

As illustrated, when the phase difference film 31 is inclined by for example −30°, it is seen that the range of the incident angle deg of light having the lowered transmittance becomes relatively wide. This means that it is sufficient to deal with the angle of emission of the lamp as the range of the incident angle deg. Correction over a wide range as in direct viewing type such as in a notebook type personal computer is not necessary. That is, in this example, it can be the that the transmittance of light striking within the range from for example about −10° to 10° can be suppressed and therefore the contrast can be improved.

Figure 18:
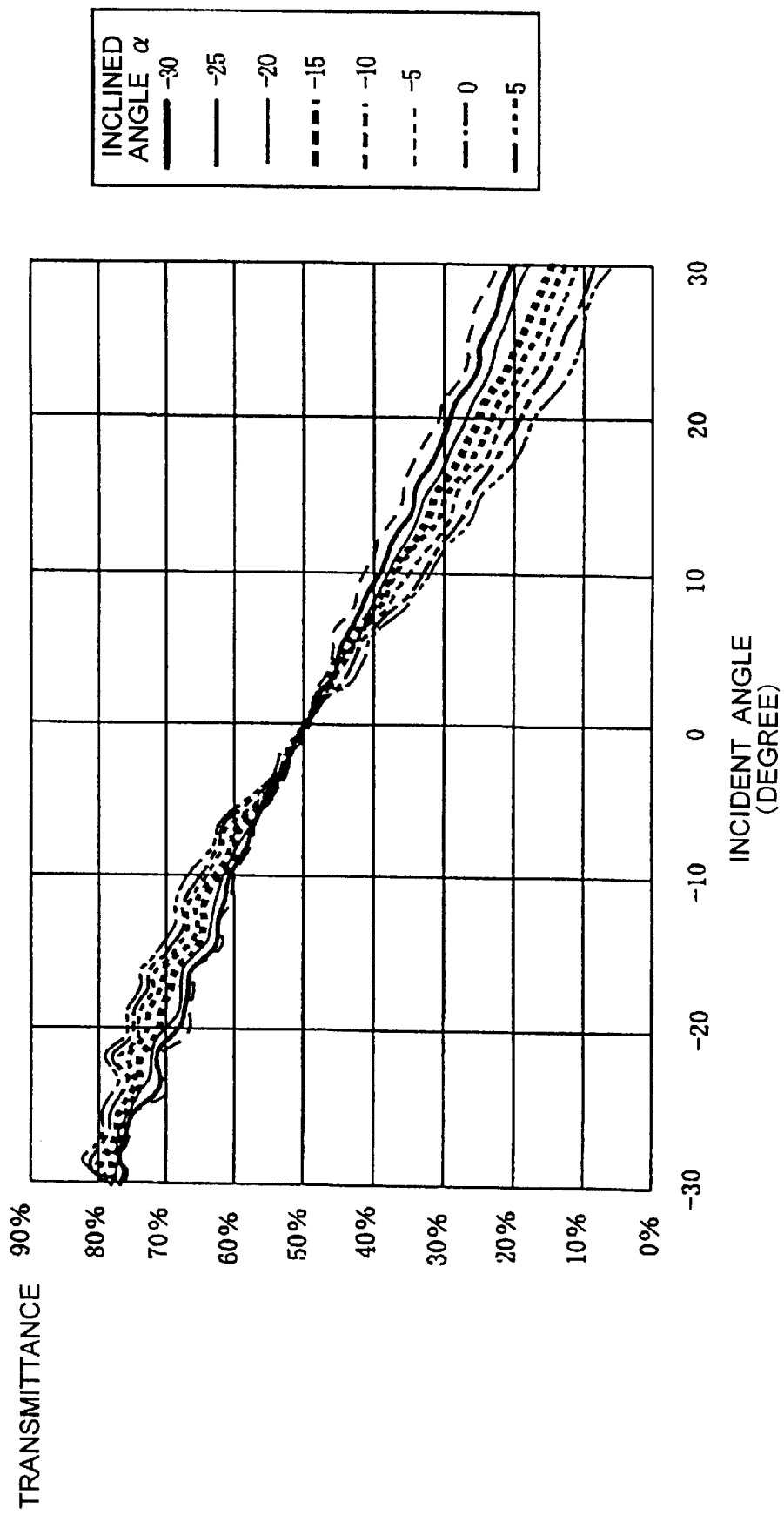
FIG. 18 is a view showing the transmittance of the intermediate level when using a λ/4 phase difference film as the incident angle dependency about the y-axis direction.

FIG. 18 shows an example of simulation under the similar conditions to that of FIG. 17 for the transmittance at the time of an intermediate level drive of for example 50%.

As seen from this figure, even under conditions setting the optimum black level, the incident angle dependency becomes small. Note that a similar tendency is seen even at a drive level other than the intermediate level of 50%. It is possible to reduce the unevenness of the viewing angle dependency in the display generated due to the unevenness of gap in the liquid crystal panels and to suppress unevenness of color.

Figure 19:
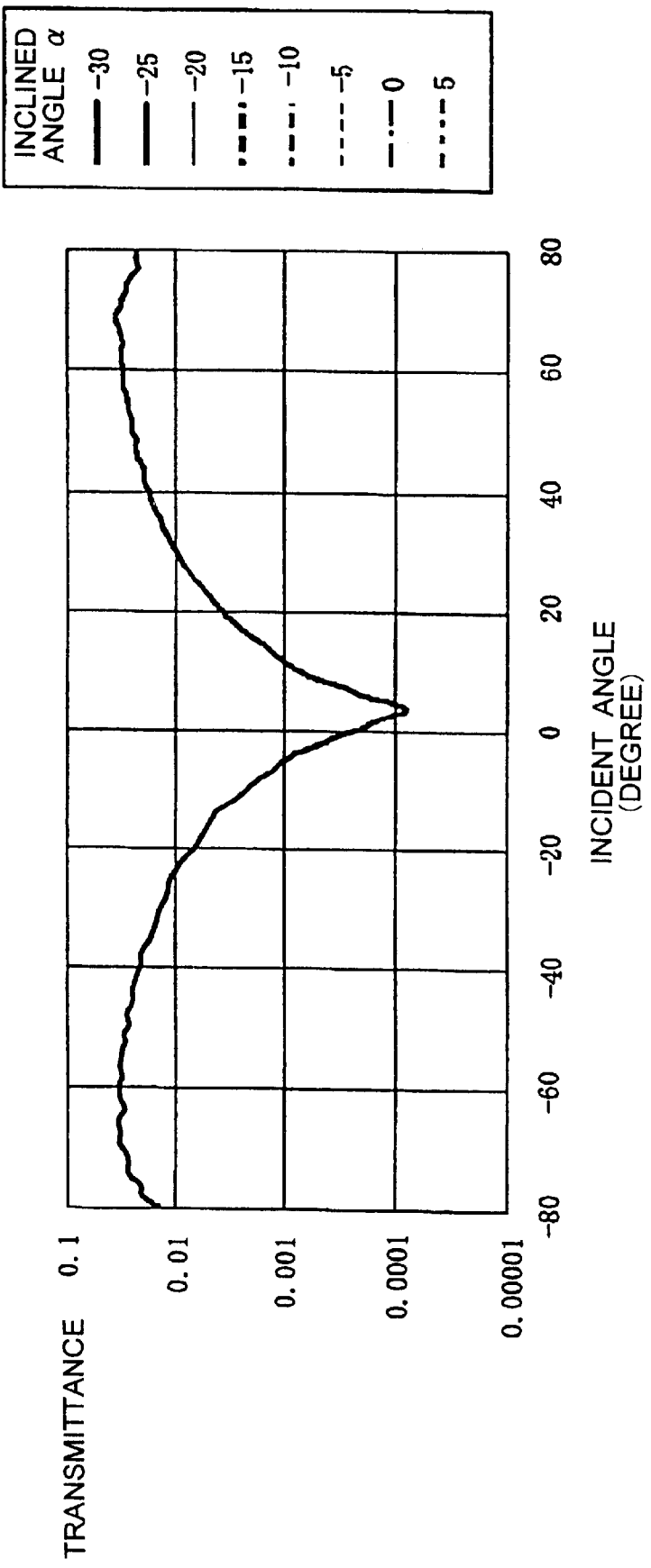
FIG. 19 is a view showing the transmittance of the black level when using a λ/4 phase difference film as the incident angle dependency about the x-axis direction.
Figure 20:
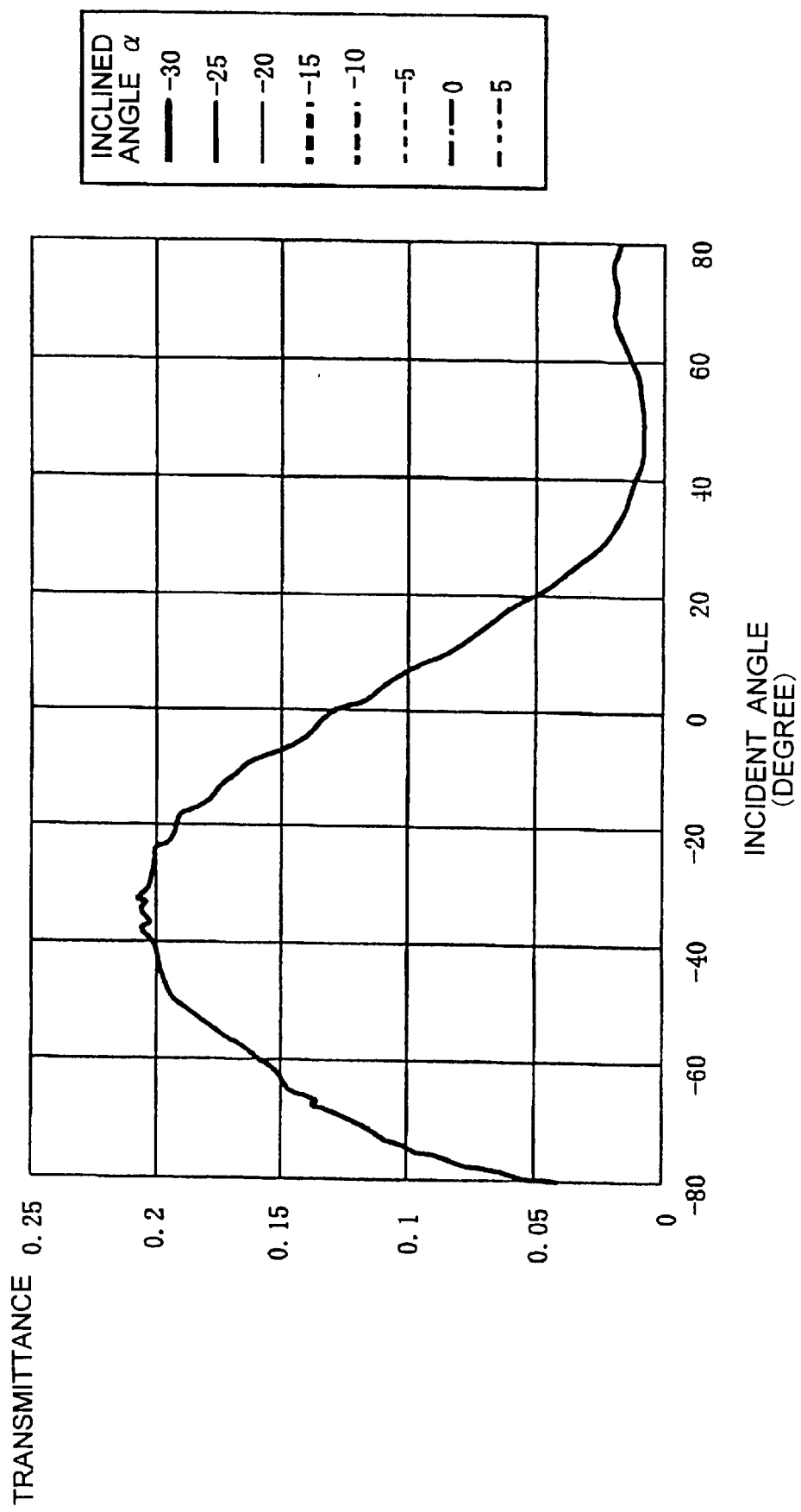
FIG. 20 is a view showing the transmittance of the intermediate level when using a λ/4 phase difference film as the incident angle dependency about the x-axis direction.

Further, FIG. 19 and FIG. 20 show examples of the case where the results shown in FIG. 17 and FIG. 18 are viewed about the x-axis direction. In these figures, the curves corresponding to the angles of arrangement of the phase difference film 31 all overlap. Namely, this means that the transmittance does not change even if the inclination of the phase difference film 31 changes for light incident inclined about the x-axis. That is, it is considered even when the pretilt angle of the orientation film 32a at the incident side is corrected in the liquid crystal panel 32, it has no influence upon the pretilt angle of the orientation film 32b at the exit side. Accordingly, it is seen that the pretilt angle of the orientation film 32a and the pretilt angle of the orientation film 32b on the exit side can be independently adjusted.

Further, in the present invention, it is also considered that the optimum inclination angle can be detected by projecting the image on the screen and using the inclination angle adjustment jig 60 to vary the inclination angle of the phase difference film 31.

FIG. 21 through FIG. 26 show examples of the results of simulation when assuming that the intensity distribution of the lamp 2 is close to normal distribution. Note that the simulation conditions explained by FIG. 17 through FIG. 20 are applied to the viewing angle dependency of the liquid crystal panel. Note that, in the examples shown in FIG. 21 through FIG. 26, the center of the incident angle of the light from the lamp 2 is shifted by for example 3° (right direction) assuming optimization of the black level when the phase difference film is not arranged.

Figure 21:
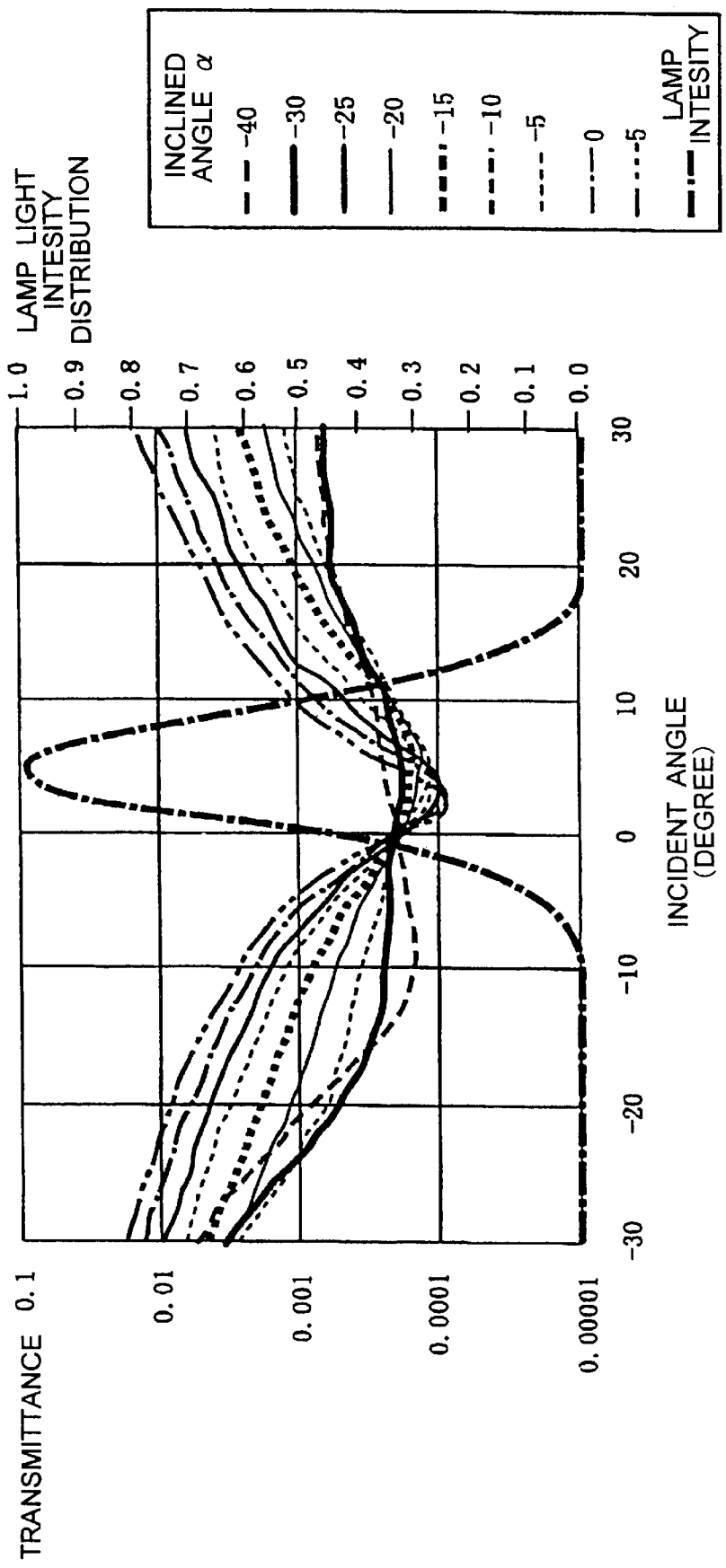
FIG. 21 is a view showing the lamp intensity distribution and the degree of improvement of the black level when the angle of incidence of the light is small.

FIG. 21 is a view showing by curves the distribution of the lamp intensity when the spread angle of the lamp is small and the degree of improvement of the black level (transmittance) when using a λ/4 phase difference film, and FIG. 22 is a view showing by numerical values the inclination angle, improvement ratio, and the contrast. Note that the parameters of the lamp 2 are determined to be for example a spread angle deg=14, a luminance center θ0=5, a dispersion σ=8, and an attenuation index n=3.

As seen from the lamp intensity curve shown in FIG. 21, the center of the incident angle of the light is inclined, so the inclination angle α=0 corresponds to the case where there is no phase difference film. Accordingly, the maximum contrast is obtained when the incident angle θ0=3. Further, when enlarging the viewing angle, improvement is possible by bringing the incident angle θ0 into register with the center when the viewing angle is improved (the center of the incident angle is further shifted to the right by 2°).

As shown by the numerical values in FIG. 22, the inclination angle of the phase difference film 31 giving the lowest transmittance and the maximum contrast is the inclination angle α near −20 (contrast=5016).

That is, when the center of the incident angle of the transmittance characteristic of the black level shifts after the improvement of the viewing angle, it is possible to incline the incident angle of the light so as to make the center of the incident angle of the black level characteristic after the improvement of the viewing angle and the optical axis of the lamp 2 match.

Figure 23:
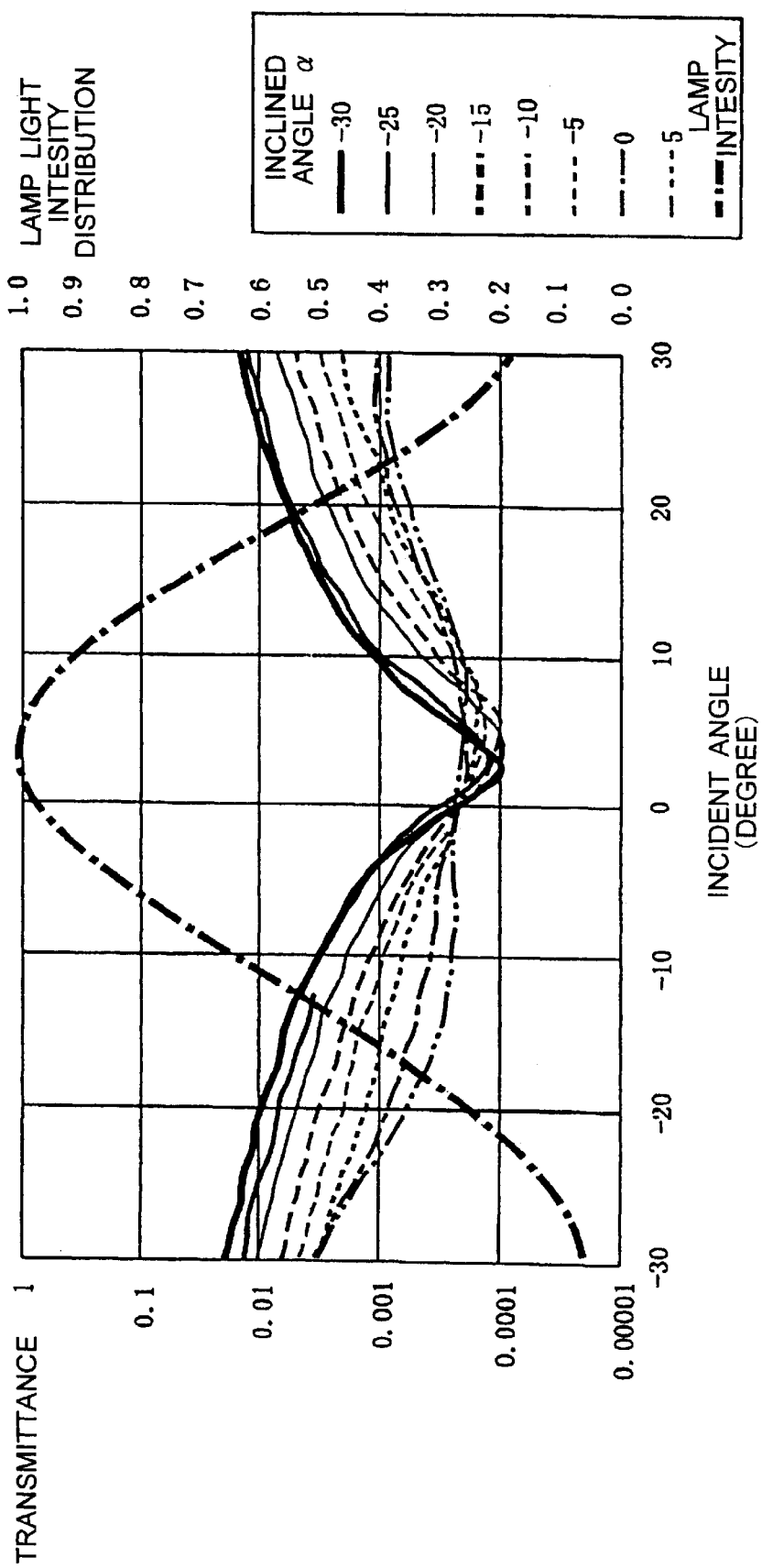
FIG. 23 is a view showing the lamp intensity distribution and the degree of improvement of the black level where the angle of incidence of the light is large.

FIG. 23 is a view showing by curves the lamp intensity distribution and the degree of improvement of the black level (transmittance) when the spread angle of the lamp is small, while FIG. 24 is a view showing the numerical values the inclination angle, improvement ratio, and the contrast. Note that the parameters of the lamp 2 are for example a spread angle deg=34, luminance center θ0=3, dispersion σ=20, and attenuation index n=2.

As seen from the lamp intensity curves shown in FIG. 23 and the contrast values shown in FIG. 24, when the spread angle deg of the lamp becomes larger, the maximum contrast is approached along with the larger inclination of the phase difference film. Note that this is considered close to the direct viewing type viewing angle characteristic.

Figure 25:
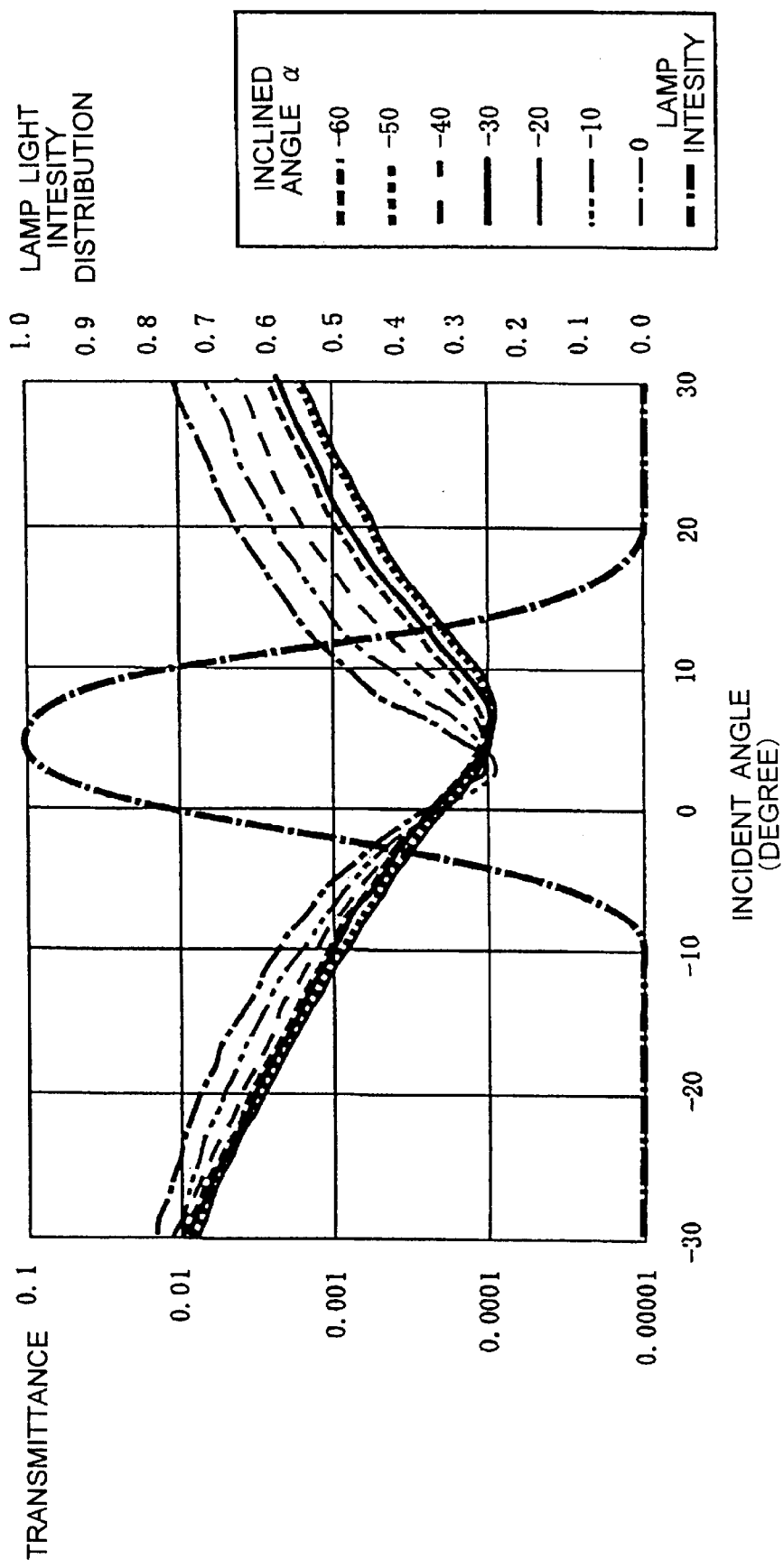
FIG. 25 is a view showing the lamp intensity distribution and the degree of improvement of the black level when using a λ/8 phase difference film.

FIG. 25 is a view showing by curves the lamp intensity distribution and the degree of improvement of the black level (transmittance) when using a λ/8 phase difference film, and FIG. 26 is a view showing by numerical values the inclination angle, improvement ratio, and the contrast. Note that, the parameters of the lamp 2 are for example a spread angle deg=14, luminance center θ0=5, dispersion σ=8, and attenuation index n=3 similar to FIG. 21.

In this case, the inclination angle of the phase difference film becomes larger than the case where the λ/4 phase difference film shown in FIG. 19 through FIG. 22 is used, but the contrast is improved more. For example, it becomes possible to obtain the maximum contrast when the inclination angle α is made equal to about −40°.

Further, by adjusting the retardation (Δnd) of the phase difference film and the inclination α of the phase delay axis (or phase forward axis), it becomes possible to further lower the transmittance. Note that this is conditional on the polarization plate and the phase delay axis (or the phase forward axis) being precisely orthogonal.

6. Other Embodiments

Figure 27:
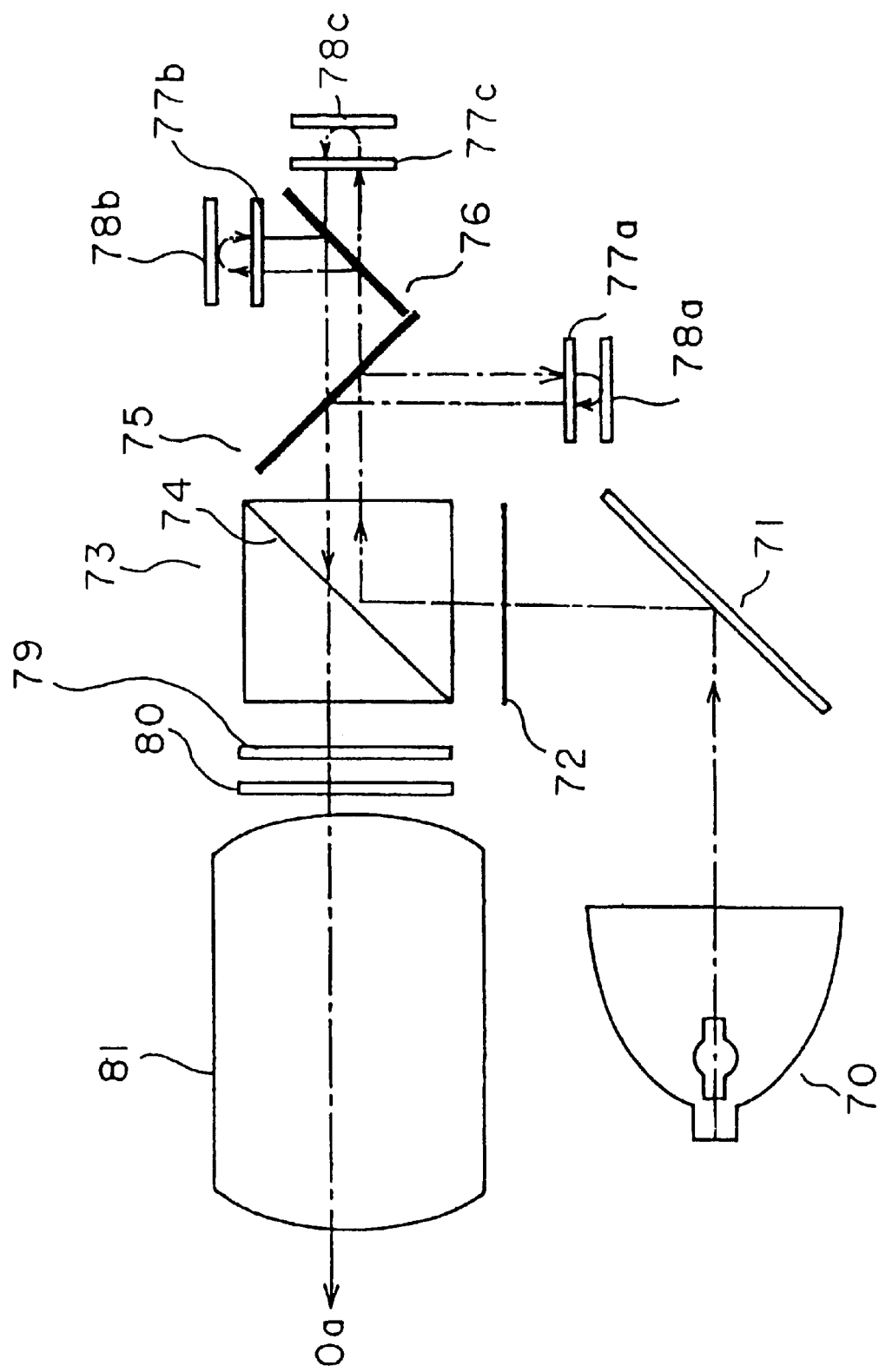
FIG. 27 is a block diagram of an example of the configuration of a liquid crystal projector provided with a reflection type liquid crystal panel according to another embodiment of the present invention.

In the above embodiments, a liquid crystal projector provided with for example a transmission type liquid crystal panel was given as an example, but it is also possible to apply the present invention to a liquid crystal projector using a reflection type liquid crystal panel as shown in FIG. 27.

In FIG. 27, only the visible light of the light (illumination light) emitted from a lamp 70 is selectively reflected by a cold mirror 71 and strikes a polarization plate 72 capable of transmitting only for example the S-polarized wave therethrough. This polarization plate 72 is configured so that it can pass only for example the S-polarized wave, so only for example the S-polarized wave strikes a polarization separation portion 73.

The polarization separation portion 73 is configured by a polarization beam splitter 74. The S-polarized wave can be reflected by the polarization beam splitter 74. The light reflected here is split to R, G, and B light by a dichroic mirror 75 and a dichroic mirror 76 used as the color splitting/combining means.

The dichroic mirror 75 reflects for example only the R light and allows the G light and the B light to pass therethrough. Accordingly, the R light reflected at the dichroic mirror 75 strikes a reflection type liquid crystal panel 78a via a phase difference film 77a. Further, the dichroic mirror 76 is made to reflect for example the G light and pass the B light. The G light strikes a liquid crystal panel 78b via a phase difference film 77b while the B light strikes a liquid crystal panel 78c via a phase difference film 77c. Due to this, the R light, G light, and the B light strike the liquid crystal panels 78 (a, b, c) via the phase difference films 77a, 77b, and 77c in the state corrected In the polarization direction.

The G light and the B light passing through the dichroic mirror 75 strike the dichroic mirror 76, where the G light Is reflected and the B light passed therethrough The B light passed through the dichroic mirror 76 is optically modulated at the liquid crystal panel 78c, whereby it is converted to the B light of the optical image of the P-polarized wave (B optical image) and strikes the dichroic mirror 76 again to pass therethrough. Further, the G light reflected at the dichroic mirror 76 is optically modulated at the liquid crystal panel 78b, whereby it is converted to the G light of the optical image of the P-polarized wave (G optical image) and strikes the dichroic mirror 76. Namely, the B optical image and the G optical image are combined here by the dichroic mirror 76 and strike the dichroic mirror 75 as the BG optical image. The dichroic mirror 75 passes the BG optical image therethrough and reflects the R optical image from the liquid crystal panel 78a, whereby the RGB optical image (P-polarized wave) is formed.

The RGB optical image formed by the dichroic mirror 75 strikes the polarization separation portion 73, but since it has been converted to the P-polarized wave, it passes through the polarization beam splitter 74 and is projected on the not illustrated screen by a projection lens 81 via the phase difference films 79 and a polarization plate 80. At this time, the polarization direction of the optical image emitted from the liquid crystal panels 78 (a, b, c) is corrected by the phase difference films 77 and brought into correspondence with the polarization direction of the polarization plate 80.

Further, at the liquid crystal panels 78 (a, b, c), the light which was not modulated and returned as the S-polarized wave is reflected at the polarization beam splitter 74, therefore does not reach the projection lens 81. Accordingly, only the light modulated at the liquid crystal panels 78 (a, b, c) is projected as the optical images and the color image is formed on the screen.

In the example shown in this figure, in the optical path between the lamp 70 and the projection lens 81, for example, the phase difference films 77 are arranged as the first phase difference means between the polarization plate 72 and the liquid crystal panels 78 (a, b, c), and the phase difference film 79 is arranged as the second phase difference means between the liquid crystal panels 78 (a, b, c) and the polarization plate 80. That is, the light striking the liquid crystal panel 78 is corrected in phase by the phase difference films 77, while the light optically modulated at the liquid crystal panel 78 is corrected in phase by the phase difference film 79 and emitted therefrom.

Note that, in the example shown in this figure, if at least one of the phase difference film 77 or 79 is provided, the contrast can be improved. Further, although not illustrated, it is also possible to arrange a second phase difference film together with the phase difference film between the polarization plate 72 and the liquid crystal panel 78 and possible to arrange a second phase difference film together with phase difference film 79 between the liquid crystal panel 78 and the polarization plate 80.

Further, in the example, the example of using one of the phase difference film or the viewing angle enlargement film was mentioned, but a configuration in which they are mixed in the identical liquid crystal projector can also be employed.

Summarizing the effects of the invention, as explained above, the liquid crystal projector of the present invention arranges between the liquid crystal panel and the polarization plate a phase difference means (phase difference film) having one of its phase delay axis or phase forward axis which is orthogonal to the polarization axis of the first or second polarization plate and arranged inclined by a predetermined angle about an axis of rotation comprised of an axis parallel to the polarization axis of the first or second polarization plate in the plane in which the phase delay axis or phase forward axis is formed.

By this, it becomes possible to obtain light of a polarization direction corresponding to the pretilt angle at the orientation film interface of the liquid crystal panel. Accordingly, even when trying to use the marginal light in order to obtain a high luminance, it becomes possible to the light blocking property of the liquid crystal panel and thereby improve the contrast and becomes possible to form an image excellent in contrast with a high luminance free from black color whitening.

Further, by arranging the phase delay axis (or phase forward axis) of the phase difference film to correspond to the polarization axis of the first (incident side) or the second (emission side) polarization plate, the viewing angle can be adjusted for each of the pretilt angles of the orientation film on the incident side of the liquid crystal panel and the orientation film on the exit side.

Namely, it becomes possible to independently adjust the pretilt angles on the incident side and the emission side. Further, the viewing angle can be adjusted for every liquid crystal panel, so it becomes possible to suppressing display unevenness due to the viewing angle dependency caused at each liquid crystal panel and therefore form a good color image without unevenness of color.

Further, since the phase difference film can be arranged with its phase delay axis or phase forward axis at the predetermined angle with respect to the polarization plate, by superimposing a plurality of films and cutting them in that state by the required angle, it is possible to form a phase difference means of a planar shape. Due to this, it is possible to reduce the space taken by the portion where the phase difference film is arranged in the direction of advance of the light.

Further, also by alternately joining the first phase difference means and the second phase difference means cut along the inclination direction at a predetermined angle in the inclined state and arranging them that the phase delay axis of the first phase difference means and the phase forward axis of the second phase difference means become parallel, it is possible to reduce the space taken in the direction of advance of the light. Further, since the first phase difference film and the second phase difference film are arranged so that the angles of arrangement thereof become symmetric with respect to the joining direction, it becomes possible to deal with pretilt angles in the identical direction.

Further, the phase difference film is held by an angle adjustment means having a center portion in the direction of transmission of light as the first axis of rotation and having one of the phase delay axis or the phase forward axis as the second axis of rotation. Accordingly, it is possible to project the required image on to for example a screen and in that state adjust the angle of arrangement of the phase difference film by the angle adjustment means so as to search for the direction of arrangement of for example the phase delay axis (or the phase forward axis) corresponding to the pretilt angle. By this, the optimum direction of arrangement of the phase delay axis (or phase forward axis) can be grasped. A planar-shaped phase difference means described before can be formed based on this direction of arrangement of the phase delay axis. Further, it becomes possible to configure an optical compensating means (viewing angle enlargement film) corresponding to the pretilt angle in accordance with the angle of arrangement of the phase delay axis.

Further, the liquid crystal projector of the present invention provides a first polarization plate which is arranged at the incident side of the liquid crystal panel and passes a first polarized beam focused by the illumination optical system therethrough, a second polarization plate which is arranged at the exit side of the liquid crystal panel, passes a second polarized beam modulated by the liquid crystal panel therethrough, and outputs the same to the projection lens, and an optical compensating means (viewing angle enlargement film) having a phase delay axis or the phase forward axis in the required axial orientation arranged at a required angle with respect to the polarization axis of the first or second polarization plate. That is, in the same way as the case where the phase difference film is used, it becomes possible to obtain light of a polarization direction corresponding to the pretilt angle at the orientation film interface of the liquid crystal panel. Accordingly, it becomes possible to improve the light blocking property of the liquid crystal panel and therefore improve the contrast and becomes possible to form an image excellent in contrast with the high luminance free from black color whitening.

Further, as a similar effect to the use of a phase difference film, by arranging a viewing angle enlargement film having a phase delay axis (or phase forward axis) corresponding to the polarization axis of the first (incident side) or the second (exit side) polarization plate, the viewing angle can be adjusted for each of the pretilt angles of the orientation film at the incident side of the liquid crystal panel and the orientation film at the emission side, so the pretilt angles on the incident side and the emission side can be independently adjusted. Further, the viewing angle can be adjusted for every liquid crystal panel, so it becomes possible suppress display unevenness due to the viewing angle dependency caused for every liquid crystal panel and to thereby form a good color image without color unevenness.

Further, by holding the viewing angle enlargement film by the angle adjusting means, it becomes possible to search for the direction of arrangement of for example the phase delay axis (or the phase forward axis) corresponding to the pretilt angle and becomes possible to grasp the optimum direction of arrangement of the phase delay axis (or the phase forward axis) in the related viewing angle enlargement film. Accordingly, for example an angle of arrangement of the phase delay axis similar to the case of the phase difference film can be realized.

Further, when using either of the phase difference film or the viewing angle enlargement film, by making the main light of the lamp be inclined with respect to the normal line of the liquid crystal panel in accordance with the inclination angle of the phase delay axis or the phase forward axis, when the center of the incident angle of the transmittance characteristic of the black level shifts after the improvement of the viewing angle by the inclination angle of the phase delay axis, it is possible to incline the incident angle of the light so as to make the center of the incident angle of the black level characteristic after the improvement of the viewing angle and the optical axis of the lamp match.

Further, by bringing the inclination angle of the phase delay axis or the phase forward axis into register with the angular distribution of the light of the illumination optical system for illuminating the liquid crystal panel, it becomes possible to improve the illumination efficiency more.

While the invention has been described with reference to specific embodiment chosen for purpose of illustration, it should be apparent that numerous modifications could be made thereto by those skilled in the art without departing from the basic concept and scope of the invention.

What is claimed is:

1. A liquid crystal projector comprising:
   a light source;
   an illumination optical system for converging the light emitted from said light source to a required optical path;

a liquid crystal panel for optically modulating the light converged by said illumination optical system;

a projection lens for magnifying and projecting the light modulated by said liquid crystal panel;

a first polarization plate which is arranged at an incident side of said liquid crystal panel and transmits a first polarized light converged by said illumination optical system therethrough;

a second polarization plate which is arranged at an exit side of said liquid crystal panel, transmits a second polarized light modulated by said liquid crystal panel therethrough, and outputs the same to said projection lens; and a phase difference means having one of a phase delay axis or a phase forward axis which is orthogonal to a polarization axis of said first or second polarization plate and arranged inclined by a predetermined angle about an axis of rotation comprised of an axis parallel to the polarization axis of said first or second polarization plate in the plane in which said phase delay axis or phase forward axis is formed.

2. A liquid crystal projector as set forth in claim 1, wherein said phase difference means is arranged between said first polarization plate and said liquid crystal panel with one of its phase delay axis or phase forward axis orthogonal to the polarization axis of the first polarization plate and inclined by a predetermined angle about an axis of rotation comprised of an axis parallel to the polarization axis of the first polarization plate in the plane in which the phase difference means is formed.

3. A liquid crystal projector as set forth in claim 1, wherein said phase difference means comprises:

a first phase difference means arranged between said first polarization plate and said liquid crystal panel with one of its phase delay axis or phase forward axis orthogonal to the polarization axis of the first polarization plate and inclined by a predetermined angle about an axis of rotation comprised of an axis parallel to the polarization axis of the first polarization plate in the plane in which the phase difference means is formed, and a second phase difference means arranged with one of its phase delay axis or phase forward axis orthogonal to the polarization axis of the second polarization plate and inclined by a predetermined angle about an axis of rotation comprised of an axis parallel to the polarization axis of the second polarization plate in the plane in which the phase difference means is formed.

4. A liquid crystal projector as set forth in claim 1, wherein said phase difference means is arranged between said liquid crystal panel and said second polarization plate with one of its phase delay axis or phase forward axis orthogonal to the polarization axis of the second polarization plate and inclined by a predetermined angle about an axis of rotation comprised of an axis parallel to the polarization axis of the second polarization plate in the plane in which the phase difference means is formed.

5. A liquid crystal projector as set forth in claim 1, wherein said phase difference means comprises:

a first phase difference means arranged between said liquid crystal panel and said second polarization plate with one of its phase delay axis or phase forward axis orthogonal to the polarization axis of the first polarization plate and inclined by a predetermined angle about an axis of rotation comprised of an axis parallel to the polarization axis of the first polarization plate in the plane in which the phase difference means is formed, and a second phase difference means arranged with one of its phase delay axis or phase forward axis orthogonal to the polarization axis of the second polarization plate and inclined by a predetermined angle about an axis of rotation comprised of an axis parallel to the polarization axis of the second polarization plate in the plane in which the phase difference means is formed.

6. A liquid crystal projector as set forth in claim 1, wherein said phase difference means comprises:

a first phase difference means arranged between said first polarization plate and said liquid crystal panel with one of its phase delay axis or phase forward axis orthogonal to the polarization axis of the first polarization plate and inclined by a predetermined angle about an axis of rotation comprised of an axis parallel to the polarization axis of the first polarization plate in the plane in which the phase difference means is formed, and a second phase difference means arranged between said liquid crystal panel and said second polarization plate with one of its phase delay axis or phase forward axis orthogonal to the polarization axis of the second polarization plate and inclined by a predetermined angle about an axis of rotation comprised of an axis parallel to the polarization axis of the second polarization plate in the plane in which the phase difference means is formed.

7. A liquid crystal projector as set forth in claim 1, wherein said phase difference means is obtained by superposing a plurality of rectangular films and cutting them in that state along an inclination direction of said predetermined angle.

8. A liquid crystal projector as set forth in claim 1, wherein said phase difference means is held by a phase adjustment means having a center portion of said phase difference means in the direction of transmission of light as a first axis of rotation and having one of the phase delay axis or phase forward axis as a second axis of rotation.

9. A liquid crystal projector as set forth in claim 1, wherein a main light beam of illumination light illuminated from said illumination optical system to said liquid crystal panel is inclined with respect to a normal line of said liquid crystal panel in accordance with an angle of inclination of said phase delay axis or phase forward axis.

10. A liquid crystal projector as set forth in claim 1, wherein said angle of inclination of said phase delay axis corresponds to the angular distribution of light of the illumination optical system illuminating the liquid crystal panel.

11. A liquid crystal projector comprises:

a light source;

a illuminator optical system for converging the light emitted from said light source to a required optical path;

a liquid crystal panel for optically modulating the light converged by said illumination optical system;

a projection lens for magnifying and projecting the light modulated by said liquid crystal panel;

a first polarization plate which is arranged by an incident side of said liquid crystal panel and transmits a first polarized light converged by said illumination optical system therethrough;

a second polarization plate which is arranged at an exit side of said liquid crystal panel; transmits a second polarized light modulated by said liquid crystal panel therethrough, and outputs the same to said projection lens;

a phase difference means having one of a phase delay axis or a phase forward axis which is orthogonal to a polarization axis of said first and second polarization plate and arranged inclined by a predetermined angle abut an axis of rotation comprised of an axis parallel to the polarization axis of said first or second polarization plate in the plane in which said phase delay axis or phase forward axis is formed;

an optical compensating means which has a phase delay axis in an axial direction which is arranged at a predetermined angle with respect to the polarization axis of said first or second polarization plate.

12. A liquid crystal projector as set forth in claim 11, wherein said optical compensating means is arranged between said first polarization plate and said liquid crystal panel with one of its phase delay axis or phase forward axis inclined by a predetermined angle with respect to the polarization axis of the first polarization plate.

13. A liquid crystal projector as set forth in claim 11, wherein said optical compensating means comprises:

a first optical compensating means arranged between said first polarization plate and said liquid crystal panel with one of its phase delay axis or phase forward axis inclined by a predetermined angle with respect to the polarization axis of the first polarization plate, and a second optical compensating means arranged with one of its phase delay axis or phase forward axis inclined by a required angle with respect to the polarization axis of the second polarization plate.

14. A liquid crystal projector as set forth in claim 11, wherein said optical compensating means is arranged between said liquid crystal panel and said second polarization plate with one of its phase delay axis or phase forward axis inclined by a predetermined angle with respect to the polarization axis of the second polarization plate.

15. A liquid crystal projector as set forth in claim 11, wherein said optical compensating means comprises:

a first optical compensating means arranged between said liquid crystal panel and said second polarization plate with one of its phase delay axis or phase forward axis inclined by a predetermined angle with respect to the polarization axis of the first polarization plate, and a second optical compensating means arranged with one of its phase delay axis or phase forward axis inclined by a predetermined angle with respect to the polarization axis of the second polarization plate.

16. A liquid crystal projector as set forth in claim 11, wherein said optical compensating means comprises:

A first optical compensation means arranged between said first polarization plate and said liquid crystal panel with one of its phase delay axis or phase forward axis inclined by a predetermined angle with respect to the polarization axis of the first polarization plate, and a second optical compensating means arranged with one of its phase delay axis or phase forward axis inclined by a predetermined angle with respect to the polarization axis of the second polarization plate said second optical compensating means being between said liquid crystal panel and said second polarization plate.

17. A liquid crystal projector as set forth in claim 11, wherein said optical compensating means is held by an angle adjustment means having a center portion of said optical compensating means in the direction of transmission of light as a first axis of rotation.

18. A liquid crystal projector as set forth in claim 11, wherein a main light beam of illumination light illuminated from said illumination optical system to said liquid crystal panel is inclined with respect to a normal line of said liquid crystal panel in response to an angle of inclination of said phase delay axis or phase forward axis.

19. A liquid crystal projector as set forth in claim 11, wherein said angle of inclination of said phase delay axis corresponds to the angular distribution of light of the illumination optical system illuminating the liquid crystal panel.

* * * * *